(12) United States Patent
Chan et al.

(10) Patent No.: US 11,358,211 B2
(45) Date of Patent: Jun. 14, 2022

(54) OFFSET COLLAR DELIVERY FOR SWAGE TOOLS

(71) Applicant: The Boeing Company, Chicago, IL (US)

(72) Inventors: Kwok Tung Chan, Seattle, WA (US); Tanni Sisco, Mukilteo, WA (US); Jeff Devlin, Seattle, WA (US); Brendan Elmore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/321,684

(22) Filed: May 17, 2021

(65) Prior Publication Data

US 2021/0276072 A1 Sep. 9, 2021

Related U.S. Application Data

(62) Division of application No. 16/140,174, filed on Sep. 24, 2018, now Pat. No. 11,033,952.

(51) Int. Cl.
*B21J 15/32* (2006.01)
*B21J 15/02* (2006.01)
*B21J 15/14* (2006.01)
*F16B 19/05* (2006.01)

(52) U.S. Cl.
CPC ............ *B21J 15/32* (2013.01); *B21J 15/022* (2013.01); *B21J 15/142* (2013.01); *F16B 19/05* (2013.01)

(58) Field of Classification Search
CPC ........ B21J 15/022; B21J 15/142; B21J 15/32; F16B 19/05; Y10T 29/49947; Y10T 29/49948; Y10T 29/49954; Y10T 29/49959; Y10T 29/49963
See application file for complete search history.

(56) References Cited

U.S. PATENT DOCUMENTS

| | | | |
|---|---|---|---|
| 5,697,521 A * | 12/1997 | Dixon ...................... | B21J 15/32 221/297 |
| 7,954,218 B2 * | 6/2011 | Tomchick ............. | B23P 19/006 227/112 |
| 2013/0255053 A1 * | 10/2013 | Erickson ................ | B21J 15/022 901/41 |
| 2015/0184689 A1 * | 7/2015 | Godfrey ................... | B21J 15/38 29/515 |
| 2017/0165844 A1 * | 6/2017 | Brockway .............. | B21J 15/022 |
| 2022/0048096 A1 * | 2/2022 | Gostylla ............... | B23P 19/002 |

OTHER PUBLICATIONS

European Office Action; Application 19195086.4; dated Oct. 4, 2021.

* cited by examiner

*Primary Examiner* — Sarang Afzali
*Assistant Examiner* — Darrell C Ford
(74) *Attorney, Agent, or Firm* — Duft & Bornsen, PC

(57) ABSTRACT

Systems and methods are provided for fastening via a swage tool. One embodiment is a method for fastening via a swage tool. The method includes steps of selecting a hole located at a part, aligning an axis of a lockbolt collar with a center of the hole, placing the lockbolt collar flush against the part at a first end of the hole, and swaging the lockbolt collar onto a lockbolt that has been driven through the hole. This securely fastens the lockbolt collar to the lockbolt.

28 Claims, 24 Drawing Sheets

OFFSET COLLAR DELIVERY FOR SWAGE TOOLS

RELATED APPLICATIONS

This patent application is a division of U.S. patent application Ser. No. 16/140,174, filed on Sep. 24, 2018, which issued as U.S. Pat. No. 11,033,952 on Jun. 15, 2021.

FIELD

The disclosure relates to the field of fabrication, and in particular, to swage tools.

BACKGROUND

The number of fasteners (e.g., bolts) used to assemble aircraft can be astronomical. For example, a midsize commercial jetliner can have several million fasteners that are installed to join different parts together.

During installation of a fastener in the form of a lockbolt, a lockbolt collar may be placed onto the lockbolt after the lockbolt has been driven through a hole. A swage tool may then proceed to swage the collar onto the lockbolt. However, swage tools may occasionally mis-align collars with lockbolts, particularly in situations where a hole is located and/or oriented less than optimally, or is located in a position that is difficult to detect.

Therefore, it would be desirable to have a method and apparatus that take into account at least some of the issues discussed above, as well as other possible issues. For example, it would be desirable to have a method and apparatus that overcome a technical problem with automating the installation of fasteners.

SUMMARY

Embodiments described herein provide collar delivery systems for offset swage tools that operate in low clearance environments. For example, the collar delivery systems described herein may place a collar at a swage nose, without any air gap between the swage nose and the collar. This enables the swage nose to press the collar flush against a hole at an Inner Mold Line (IML) of a part in low clearance environments.

One embodiment is a method for fastening via a swage tool, the method including selecting a hole located at a part; aligning an axis of a lockbolt collar with a center of the hole; placing the lockbolt collar flush against the part at a first end of the hole; and swaging the lockbolt collar onto a lockbolt that has been driven through the hole.

A further embodiment is a non-transitory computer readable medium embodying programmed instructions which, when executed by a processor, are operable for performing a method for fastening via a swage tool. The method includes selecting a hole located at a part; aligning an axis of a lockbolt collar with a center of the hole; placing the lockbolt collar flush against the part at a first end of the hole; and swaging the lockbolt collar onto a lockbolt that has been driven through the hole.

Yet another embodiment is An apparatus for delivering lockbolt collars at a swage tool, the apparatus comprising: a pair of fingers disposed at a swage nose, each finger comprising: a vertical portion that follows the swage nose; an inclined ramp that is integral with the vertical portion that extends beyond a swaging surface of the swage nose; and an arcuate cut-out disposed at a distal portion of the inclined ramp, the arcuate cut-out having a circumference corresponding with a circumference of a lockbolt collar.

A method for placing a collar on a lockbolt, the method comprising: locating an Inner Mold Line (IML) end of a hole; sensing a centerline of the hole; holding a collar against the IML end of the hole; aligning an axis of the collar with the centerline of the hole; and inserting a lockbolt through the collar and the hole.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The illustrative embodiments recognize and take into account one or more different considerations. For example, the illustrative embodiments recognize and take into account that collar may be difficult to install onto a lockbolt that deviates from an expected installation angle.

Thus, the illustrative embodiments provide a method, an apparatus, and a system for installing fasteners. In one illustrative example, a fastener installation system comprises a platform and a collar installer. The platform is configured to be movably positioned on a structure. The collar installer is connected to the platform.

FIGS. 1-5 illustrate but one of countless automated fastener installation tools that may be monitored in accordance with the inventive processes described herein. Thus, FIGS. 1-5 shall be considered illustrative of just one of innumerable variations in tooling that may benefit from application of the inventive process.

When one component is "connected" with another component, the connection is a physical association. For example, a first component, such as a collar installer, may be considered to be physically connected to a second component, such as a platform, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically connected to the second component by being formed as part of the second component, an extension of the second component, or both.

In the illustrative example, a controller dynamically aligns a collar with a hole prior to installation of a lockbolt into the hole.

Thus, the illustrative embodiments provide a method, an apparatus, and a system for preemptively placing a collar at a hole for a lockbolt, before the lockbolt is installed.

Figure 1:
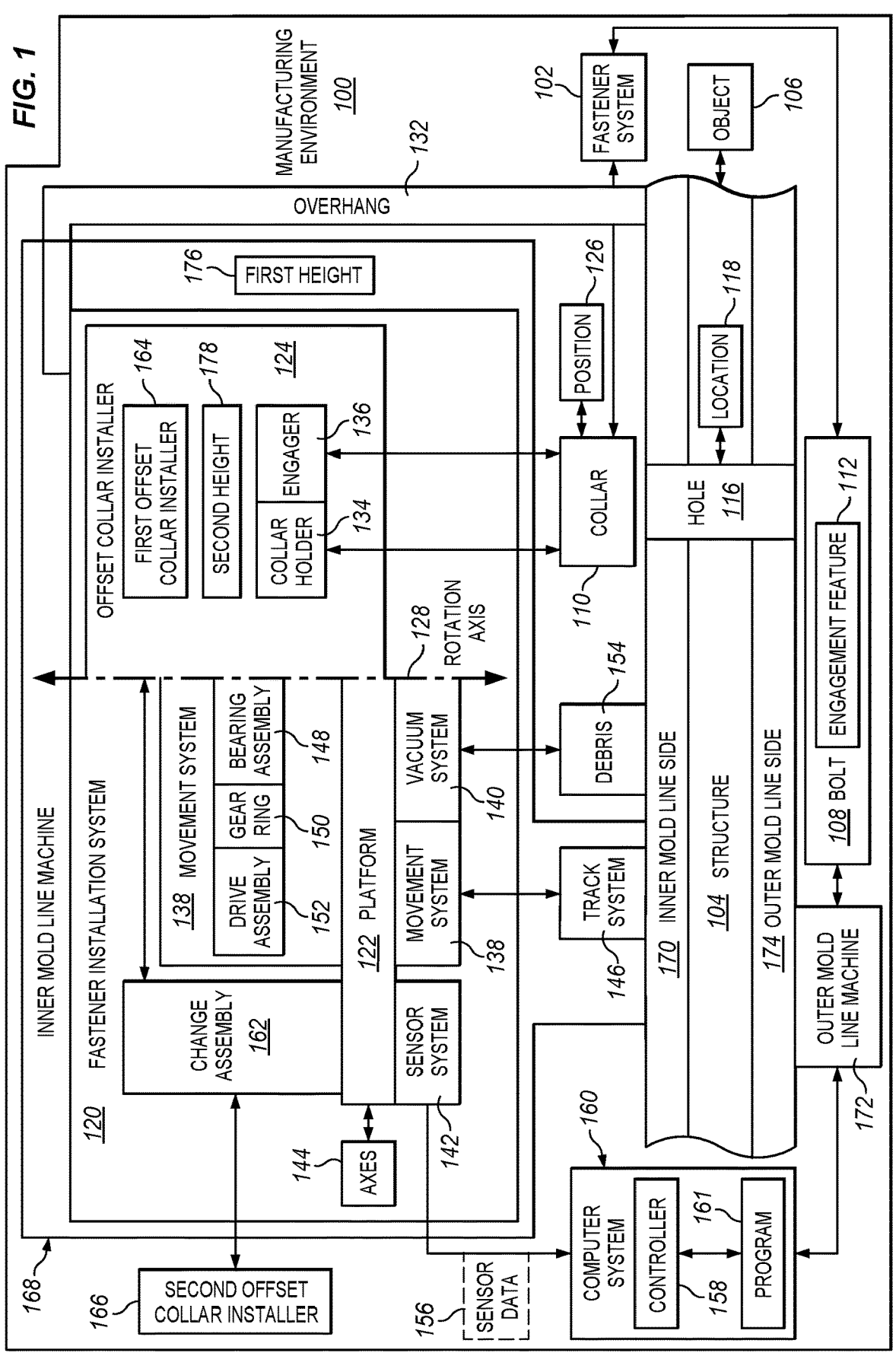
FIG. 1 is an illustration of a block diagram of a manufacturing environment in which a fastener installation system installs fasteners in accordance with an illustrative embodiment.

With reference now to the figures and, in particular, with reference to FIG. 1, an illustration of a block diagram of a manufacturing environment in which a fastener installation system installs fasteners is depicted in accordance with an illustrative embodiment. In this illustrative example, manufacturing environment 100 is an environment in which fastener 102 can be installed in structure 104 for object 106 by fastener installation system 120.

Fastener 102 includes bolt 108 and collar 110. In this illustrative example, bolt 108 can be selected from a group comprising a pin, the pin with a pin-tail, a threaded bolt, and a lock bolt.

As depicted, bolt 108 includes engagement feature 112. Engagement feature 112 can be, for example, a thread, a set of protrusions, a set of grooves, a flange, a set of annular grooves, or some other suitable type of feature that can be engaged by collar 110 and fasten collar 110 and bolt 108 to each other. Collar 110 can be selected from a group comprising a flanged collar, a threaded collar, a nut, a flangeable nut, and any other suitable structure that is configured to receive and be fastened to bolt 108.

Structure 104 can take a number of different forms. For example, structure 104 can be selected from a group comprising an assembly, a sub-assembly, a fuselage section, a wing, a wing box, a horizontal stabilizer, a landing gear system, a hydraulic system, a skin panel, a stringer, a fuselage section, a composite fuselage section, a support structure with a frame overhang, and some other structure in which fastener 102 can be installed to join two components to each other in structure 104.

Object 106 may take a number of different forms. For example, object 106 may be, for example, a mobile platform, a stationary platform, a land-based structure, an aquatic-based structure, and a space-based structure. More specifically, object 106 can be a surface ship, an aircraft, a tank, a personnel carrier, a train, a spacecraft, a space station, a satellite, a submarine, an automobile, a power plant, a bridge, a dam, a house, a manufacturing facility, a building, and other suitable types of objects.

As depicted, structure 104 includes hole 116 at location 118. In this illustrative example, fastener installation system 120 is configured to install fastener 102 in hole 116. In this illustrative example, fastener installation system 120 comprises platform 122 and collar installer 124. While a collar installer 124 is illustrated in FIG. 1, any suitable tool and/or collar installer may be utilized in accordance with the inventive techniques described herein.

During operation of fastener installation system 120, platform 122 is configured to be movably positioned on structure 104. Collar installer 124 is connected to platform 122. Collar installer 124 can hold collar 110 for installation in position 126 offset from rotation axis 128 and can fasten collar 110 to bolt 108 with engagement feature 112. As depicted, collar installer 124 can swing into position 126 offset from rotation axis 128. For example, collar installer 124 can rotate about rotation axis 128 to into position 126 offset from rotation axis 128 to install fastener 102 in hole 116.

In this illustrative example, overhang 132 may be such that all of fastener installation system 120 cannot move on structure 104 to fit under overhang 132. As depicted, collar installer 124 is configured to rotate around rotation axis 128 into position 126 offset in a manner that allows collar installer 124 to fit under overhang 132 such that collar 110 can be positioned and fastened to bolt 108 in hole 116. In other words, a portion of collar installer 124 can fit under overhang 132 or other restricted areas where other currently available collar installers in automated collar installation systems cannot fit.

In the illustrative example, fastener installation system 120 comprises collar holder 134 and engager 136. As depicted, collar holder 134 is configured to hold collar 110 in position 126 to receive bolt 108. In this example, collar 110 is stationary while bolt 108 moves through hole 116. In another illustrative example, bolt 108 is stationary in hole 116 while collar 110 moves towards hole 116 to receive bolt 108.

Engager 136 configured to fasten collar 110 to bolt 108. For example, engager 136 may swage collar 110 to bolt 108 such that collar 110 is fastened to bolt 108. In another illustrative example, engager 136 can rotate collar 110 about rotation axis 128 relative to bolt 108 to fasten collar 110 to bolt 108. As depicted, collar holder 134 and engager 136 form the collar installer 124.

In this illustrative example, fastener installation system 120 includes a number of other components. For example, fastener installation system 120 also includes movement system 138, vacuum system 140, and sensor system 142.

As depicted, movement system 138 is connected to platform 122. Movement system 138 can be configured to move at least one of platform 122 or collar installer 124. While a collar installer 124 is illustrated in FIG. 1, any suitable tool and/or collar installer may be utilized in accordance with the inventive techniques described herein. As explained above, "collars" as used herein can be selected from a group comprising a flanged collar, a threaded collar, a nut, a flangeable nut, and any other suitable structure that is configured to facilitate fastening (e.g., of a bolt).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For example, movement system 138 is connected to collar installer 124 and is configured to move collar installer 124 around rotation axis 128. Further, movement system 138 is further configured to move platform 122 along axes 144 in addition to moving the collar installer 124 around rotation axis 128.

In one illustrative example, movement system 138 can be coupled to or placed on track system 146. As depicted, the movement along axes 144 can be relative to track system 146. Axes 144 can be, for example, two axes, three axes, or some other number of axes depending on the particular implementation. In this illustrative example, platform 122 is configured to move on track system 146, which is selected from at least one of a flexible track system, a dual track system, a flexible vacuum track system configured to be attached to structure 104, or some other suitable type.

In another illustrative example, movement system 138 can move collar installer 124 about rotation axis 128 using a number of different components. As depicted, these components in movement system 138 include bearing assembly 148, gear ring 150, and drive assembly 152. Again, although a collar installer 124 and an offset swage tool are illustrated in these FIGS., the collar delivery systems described herein may be utilized for any type of tool desired.

As depicted, bearing assembly 148 is connected to collar installer 124. Bearing assembly 148 is configured to move around rotation axis 128. Gear ring 150 is connected to bearing assembly 148. Drive assembly 152 is moveably connected to gear ring 150. In this illustrative example, drive assembly 152 is configured to move gear ring 150. As a result, movement of drive assembly 152 moves bearing assembly 148 via gear ring 150.

In this illustrative example, vacuum system 140 is connected to platform 122. Vacuum system 140 is configured to remove debris 154 around hole 116. The debris can be, for example, particles generated from drilling the hole 116. In another example, when bolt 108 takes the form of a pin with a pin tail, debris 154 can include the pin tail that separates from the pin after swaging the collar to the pin. For example, when bolt 108 is a pin with a pin tail, a pin tail deflector (not shown) can guide the pin tail to a port (not shown) in vacuum system 140 after the pin tail is separated from the pin.

In this illustrative example, sensor system 142 is also connected to platform 122. As depicted, sensor system 142 is a physical hardware system that detects information about the environment around fastener installation system 120.

Sensor system 142 is configured to generate sensor data 156. Sensor data 156 can include information about structure 104, a position of collar installer 124, a position of platform 122 relative to structure 104, an image of hole 116, and other information that can be used to control the operation of fastener installation system 120. Sensor system 142 can include at least one of a camera system, a laser sensor, an ultrasonic sensor, a light detection and ranging scanner, or some other suitable type of sensor.

Sensor data 156 is sent to controller 158 located in computer system 160. Controller 158 can be implemented in at least one of software or hardware. When software is used, the operations performed by controller 158 may be implemented in program code configured to run on hardware, such as a processor unit. When firmware is used, the operations performed by controller 158 may be implemented in program code and data and stored in persistent memory to run on a processor unit. When hardware is employed, the hardware may include circuits that operate to perform the operations in controller 158.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 160 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 158 controls the operation of fastener installation system 120 utilizing program 161. Program 161 may be, for example, a computer numerical control (CNC) program or some other suitable program code that may be used to control the operation of fastener installation system 120. For example, fastener installation system 120 can be a computer numerical control (CNC) machine which uses cartesian coordinates.

Controller 158 can utilize sensor data 156 to control the operation of different components in fastener installation system 120. Although shown as a separate component, controller 158 and computer system 160 may be located on or in platform 122 in some illustrative examples.

Further, fastener installation system 120 can also include change assembly 162 that is connected to platform 122. In this example, collar installer 124 is first collar installer 164 and is connected to platform 122 indirectly through a connection to change assembly 162. First collar installer 164 is removably connected to change assembly 162. Different collar installers may be configured to install at least one of different sizes or different configurations of fasteners. In other words, a quick change can be made between collar installers to install fasteners of different sizes.

Further, platform 122, collar installer 124, movement system 138, vacuum system 140, and sensor system 142 form an inner mold line machine 168 located on inner mold line side 170 of structure 104 in this illustrative example. Further, fastener installation system 120 also can include outer mold line machine 172 configured to insert bolt 108, such as a pin, through hole 116 from outer mold line side 174 of structure 104. In this illustrative example, outer mold line machine 172 also can be controlled by controller 158 in computer system 160 to perform a coordinated installation of fastener 102 in hole 116 in structure 104.

In one illustrative example, one or more technical solutions are present that overcome a technical problem with installing fasteners via an automated tool. In the illustrative example, a swage tool may encounter issues attempting to place a collar onto a lockbolt that has been driven through a hole.

As a result, one or more technical solutions may provide a technical effect facilitating placement of collars at lockbolts by preemptively aligning collars with holes in an illustrative embodiment.

Figure 2:
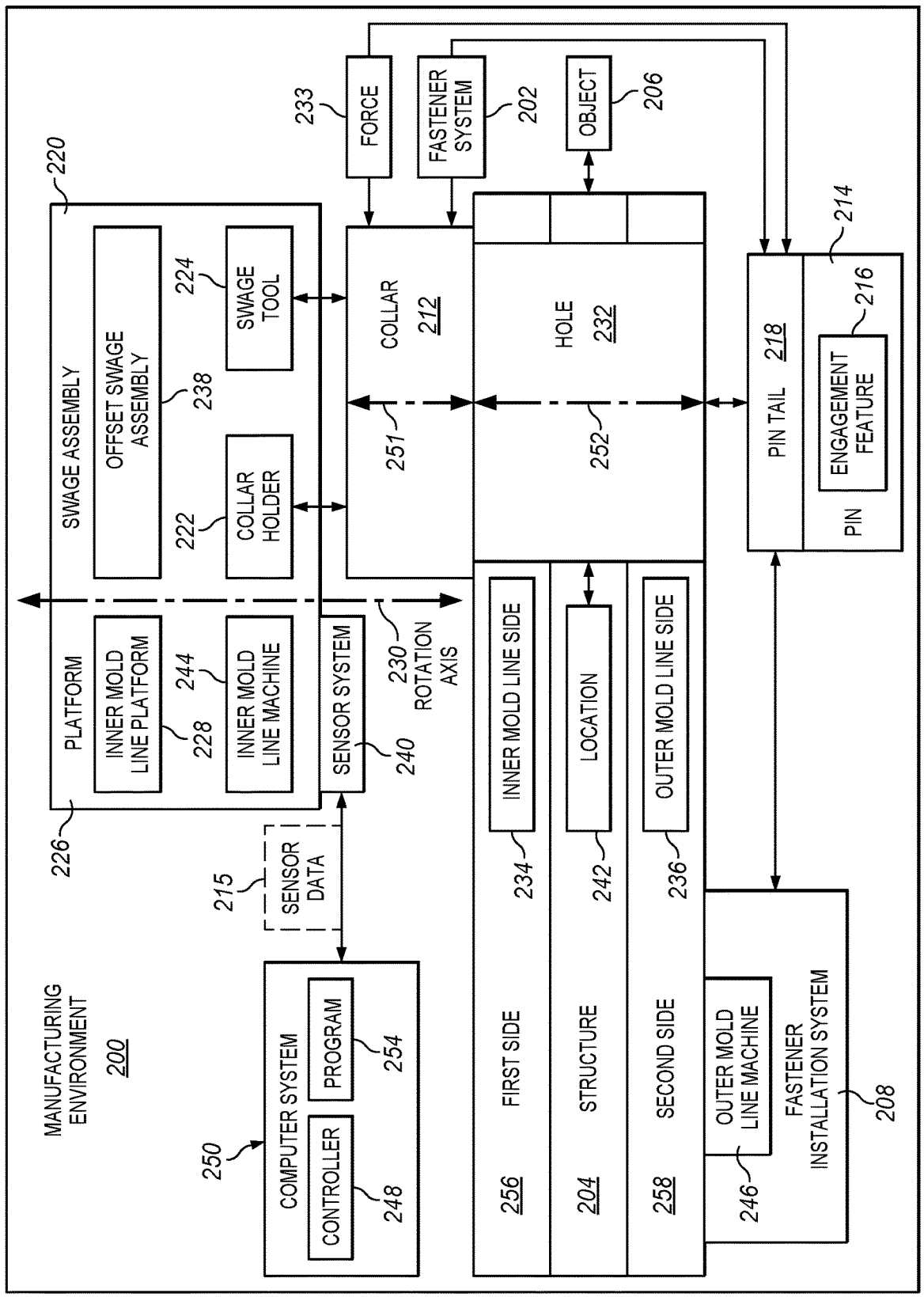
FIG. 2 is an illustration of a block diagram of a manufacturing environment in which a fastener is installed in accordance with an illustrative embodiment.

With reference next to FIG. 2, an illustration of a block diagram of a manufacturing environment in which a fastener is installed is depicted in accordance with an illustrative embodiment. Manufacturing environment 200 is an environment in which fastener 202 can be installed in structure 204 for object 206 utilizing fastener installation system 208. Structure 204 and object 206 may take various forms similar to the forms described with respect to structure 104 and object 106 in FIG. 1. Structure 204 can be, for example, without limitation, comprising a metal structure, composite structure, a metal and composite work piece, a splice, a butt splice, a splice for two fuselage sections, or some other suitable structure.

As depicted, fastener 202 comprises pin 214 and collar 212. In this illustrative example, collar 212 can be swaged to pin 214. In other words, collar 212 can be deformed to engage engagement feature 216 on pin 214. Pin 214 also may include pin tail 218. In this illustrative example, engagement feature 216 may be, for example, a thread, a set of protrusions, a set of grooves, a flange, or some other suitable type of feature that can be engaged by collar 212 and fasten collar 212 to pin 214.

As depicted, fastener installation system 208 comprises swage assembly 220, which is configured to cause collar 212 to engage with pin 214. In this illustrative example, swage assembly 220 is an example of collar installer 124 in FIG. 1 and comprises collar holder 222 and swage tool 224. Collar holder 222 is configured to hold collar 212. Swage tool 224 is configured to cause collar 212 to engage engagement feature 216 on pin 214. In this example, pin 214 and pin tail 218 are inserted into collar 212. In other words, pin 214 and pin tail 218 are moved through collar 212 after collar 212 has been positioned on hole 232.

Pin tail 218 is a component connected to pin 214. In this particular example, swage tool 224 engages pin tail 218 and pulls pin 214 through collar 212 in a manner that causes collar 212 to deform in a manner that engages engagement feature 216. Engagement feature 216 is a feature on pin 214 and not pin tail 218. Engagement feature 216 can be at least one of a set of threads, a set of grooves, a set of annular grooves, or other types of features to which collar 212 can be swaged to engage pin 214.

In the illustrative example, causing collar 212 to engage engagement feature 216 can be performed any number of different ways. For example, force 233 can be applied on at least one of collar 212 or pin tail 218 along centerline 251 extending centrally though collar 212 until pin tail 218 become separated from pin 214 such that collar 212 engages engagement feature 216 on pin 214 when pin 214 with pin tail 218 is inserted into hole 232 from second side 258. In other words, force 233 can be applied to one or both of collar 212 or pin tail 218 causing collar 212 to be swaged such that collar 212 engages engagement feature 216 on pin 214.

In this illustrative example, swage assembly 220 can include collar installer 124 in FIG. 1. Collar holder 222 can be an example of collar holder 134 in FIG. 1 and swage tool 224 can be an example of engager 136 in FIG. 1.

As depicted, swage assembly 220 is connected to platform 226. In this illustrative example, platform 226 takes the form of inner mold line platform 228. In this illustrative example, inner mold line platform 228 can be selected from a group comprising a flex track crawler, a robotic arm, and some other suitable type of platform.

In one example, swage assembly 220 is offset from swage assembly 238 such that collar 212 is held offset from rotation axis 230 on which swage assembly 220 is located. Depending on the implementation, swage assembly 220 may or may not be offset from rotation axis 230.

As depicted, collar holder 222 in swage assembly 220 is configured to position collar 212 on hole 232. In the illustrative example, the positioning is performed such that collar 212 is concentrically aligned with hole 232. For example, centerline 251 for collar 212 intercepts centerline 252 for hole 232.

In the illustrative examples, the positioning of collar 212 on hole 232 is performed such that collar 212 receives pin 214 when pin 214 is placed into hole 232 on inner mold line side 234 of structure 204 prior to insertion of pin 214 into hole 232 from outer mold line side 236. As depicted, pin 214 be moved in a single motion through hole 232 and collar 212.

When pin 214 is inserted into hole 232, outer mold line side 236 is moved to extend through collar 212, and swage assembly 220 swages the collar 212 such that collar 212 engages engagement feature 216 on pin 214.

As depicted, positioning of collar 212 on hole 232 may result in collar 212 touching the inner mold line side 234. In other illustrative examples, collar 212 may not touch inner mold line side 234 when being positioned on hole 232. In this example, swage tool 224 engages and pulls pin tail 218 such that pin tail 218 and pin 214 moves through collar 212 in a manner that causes collar 212 to swage to engage engagement feature 216 on pin 214.

In positioning the collar 212 on hole 232 on first side 256 of structure 204 prior to insertion of pin 214 into hole 232 from second side 258, swage assembly 220 holds collar 212 in collar holder 222 in swage assembly 220 and moves collar 212 such that collar 212 is positioned on hole 232 on inner mold line side 234 of structure 204. In this illustrative example, first side 256 is inner mold line side 234 and second side 258 is outer mold line side 236.

In another example, in positioning the collar 212 on hole 232 on inner mold line side 234 of structure 204 prior to insertion of pin 214 into hole 232 from outer mold line side 236, swage assembly 220 normalizes collar 212 to inner mold line side 234 and moves collar 212 onto hole 232 on inner mold line side 234 of structure 204 prior to insertion of pin 214 into hole 232 from outer mold line side 236. The normalization includes moving collar 212 about on one or more axes. This movement is performed in this example to provide concentricity between collar 212 and hole 232.

Further, fastener 202 also may include sensor system 240 similar to sensor system 142 in FIG. 1. In positioning the collar 212 on hole 232, sensor system 240 identifies location 242 of hole 232 on inner mold line side 234 and swage assembly 220 moves collar 212 onto hole 232 at location 242 on inner mold line side 234 of structure 204 prior to insertion of pin 214 into hole 232 from outer mold line side 236. As depicted, collar 212 is positioned such that concentricity is present between collar 212 and hole 232. This concentricity enables pin 214 to extend through collar 212 such that collar 212 can be fastened to pin 214.

In the illustrative example, sensor system 142 is a physical hardware system that detects information about the environment around fastener installation system 208. Sensor system 240 is configured to generate sensor data 215. Sensor system 240 can contain one or more types of sensors. For example, sensor system 240 can be selected from at least one of a camera system, a vision system, a laser range finder, or some other suitable type of sensor. Sensor data 215 generated by sensor system 240 can be used to perform alignment of collar 212 with hole 232. This alignment is performed to generate concentricity between collar 212 on hole 232 such that pin tail 218 and pin 214 can be inserted through hole 232 and extends through collar 212 in a desired manner.

In this illustrative example, swage assembly 220 and platform 226 form the inner mold line machine 244. Further, fastener installation system 208 also includes outer mold line machine 246 in this illustrative example. Outer mold line machine 246 is configured to insert pin 214 through hole 232 from outer mold line side 236 of structure 204. As depicted, collar 212 is aligned with hole 232 on inner mold line side 234 prior to pin tail 218 and pin 214 being moved through hole 232 to extend though collar 212.

In this illustrative example, inner mold line machine 244 and outer mold line machine 246 can be controlled by controller 248 in computer system 250 to perform a coordinated installation of fastener 202 in hole 232 in structure 204.

Sensor data 215 is sent to controller 248 located in computer system 250. Controller 248 can be implemented in at least one of software or hardware. When software is used, the operations performed by controller 248 may be implemented in program code configured to run on hardware, such as a processor unit. When firmware is used, the operations performed by controller 248 may be implemented in program code and data and stored in persistent memory to run on a processor unit. When hardware is employed, the hardware may include circuits that operate to perform the operations in controller 248.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 250 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 248 controls the operation of fastener installation system 208 utilizing program 254. Program 254 may be, for example, a computer numerical control (CNC) program or some other suitable program code that may be used to control the operation of fastener installation system 208.

Controller 248 can utilize sensor data 215 to control the operation of different components in fastener installation system 208. Although shown as a separate component, controller 248 and computer system 250 may be located on or in platform 226 in some illustrative examples.

In one illustrative example, fastener installation system 208 comprises collar holder 222, sensor system 240, and controller 248. In this example, collar holder 222 is configured to hold collar 212 in fastener 202. Sensor system 240 is configured to generate sensor data 215 for first side 256 of structure 204. As depicted in this example, controller 248 controls operation of sensor system 240 and collar holder 222. Controller 248 identifies location 242 of hole 232 in first side 256 of structure 204 using sensor data 215 and automatically positions the collar 212 held by collar holder 222 on hole 232 at location 242 by moving collar holder 222.

In one illustrative example, one or more technical solutions are present that overcome a technical problem with automating the installation of fasteners. Currently, automated installation processes may encounter alignment issues when attempting to place collars onto lockbolts, which may result in a need to re-attempt installation of the lockbolt.

The illustrative embodiments recognize and take into account that currently employed machines such as those that move on rails attached to structure 204 may desire enhancements which enable placing a collar on an Inner Mold Line (IML) without an airgap, ensuring that collars may be aligned with holes even in low clearance environments.

The illustrative examples provide a technical solution in which a collar delivery system provides a collar without having an air gap between the collar delivery system and a nose of a swage tool.

As a result, a technical solution in the illustrative example may have a technical effect of enabling collar placement prior to lockbolt placement, even in low clearance environments.

The illustrations of manufacturing environment 100 in FIG. 1 and manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, collar installer 124, movement system 138, vacuum system 140, and sensor system 142 have been described as being capable of forming the inner mold line machine 168 located on inner mold line side 170 of structure 104. In other illustrative examples, these components may be part of an outer mold line machine with the inner mold line machine inserting the bolt 108 from inner mold line side 170 of structure 104. As another example, first side 256 could be outer mold line side 236 while second side 258 could be inner mold line side 234 in other implementations.

Figure 3:
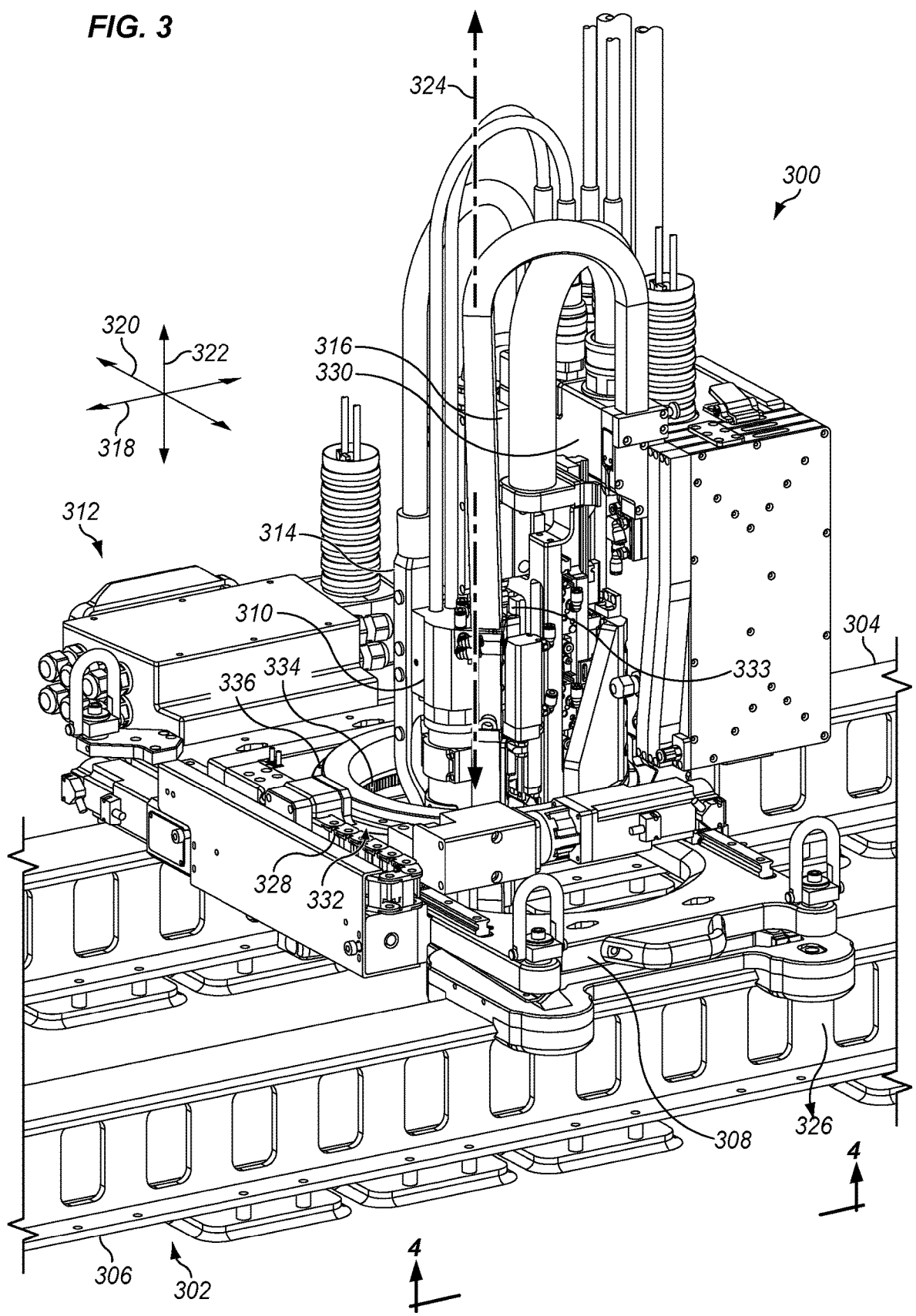
FIG. 3 is an illustration of an inner mold line machine in a fastener installation system in accordance with an illustrative embodiment.

With reference to FIG. 3, an illustration of inner mold line machine 300 in a fastener installation system is depicted in accordance with an illustrative embodiment. In this illustrative example, inner mold line machine 300 moves on track system 302. Track system 302 comprises first track 304 and second track 306.

As depicted, inner mold line machine 300 is an example of one implementation for inner mold line machine 168 in fastener installation system 120. As depicted, inner mold line machine 300 comprises platform 308, offset swage assembly 310, movement system 312, vacuum system 314, and camera 316. In this illustrative example, platform 308 is an example of one implementation for platform 122 shown in block form in FIG. 1. Offset swage assembly 310 is an example of an implementation for collar installer 124 depicted in block form in FIG. 1. Vacuum system 314 is an example of an implementation for vacuum system 140 shown in block form in FIG. 1. Camera 316 is an example of an implementation for sensor system 142 shown in block form in FIG. 1.

As depicted, movement system 312 is configured to move inner mold line machine 300 in a number of different directions. For example, movement system 312 is configured to move platform 308 in the direction of x-axis 318, y-axis 320, and z-axis 322. However, the inventive systems and methods described herein are not limited to offset devices.

Further, movement system 312 is also configured to move offset swage assembly 310 about rotation axis 324. In other words, movement system 312 can cause offset swage assembly 310 to swing around rotation axis 324. Rotation axis 324 is parallel to z-axis 322 in this illustrative example.

As depicted, motorized wheel system 326 is configured to move platform 308 along x-axis 318. Ball screw drive 328 is configured to move platform 308 along y-axis 320. Ball screw drive 330 is configured to move platform 308 along z-axis 322.

As depicted, movement system 312 is configured to move offset swage assembly 310 about rotation axis 324 with bearing assembly 332. In this view, gear ring 334 and outer ring 336 are seen in bearing assembly 332.

In this figure, offset swage assembly 310 is connected to gear ring 334 in bearing assembly 332. As depicted, gear ring 334 rotates about rotation axis 324 in this example. Outer ring 336 is connected to platform 308 and gear ring 334 is configured to rotate within outer ring 336. Further, vacuum system 314 and camera 316 are also connected to bearing assembly 332 such that these components also can be rotated about rotation axis 324. In this example, offset swage assembly 310 is removably attached to platform 308 by adapter 333.

Figure 4:
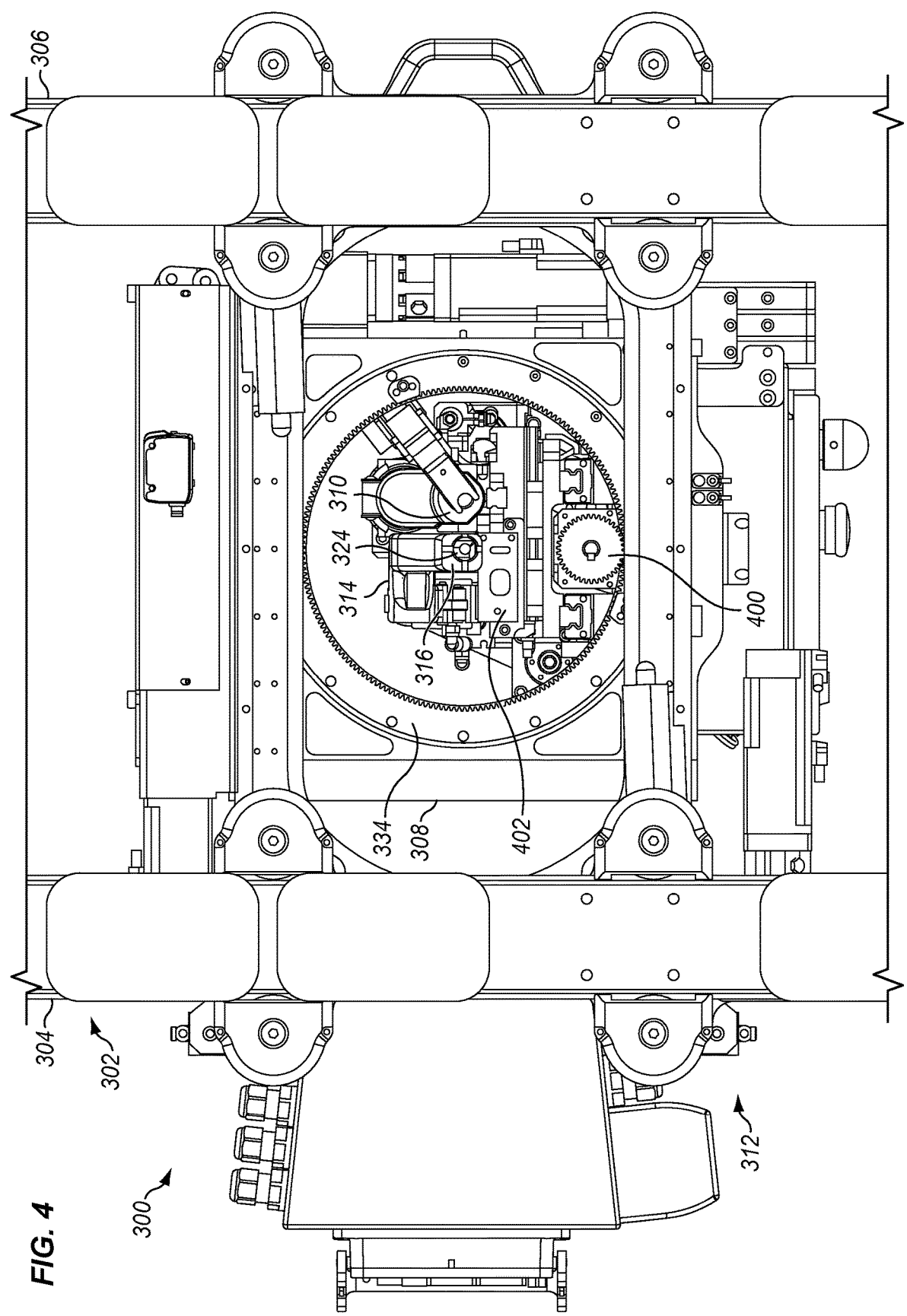
FIG. 4 is an illustration of a bottom view of an inner mold line machine in accordance with an illustrative embodiment.

With reference next to FIG. 4, an illustration of a bottom view of inner mold line machine 300 is depicted in accordance with an illustrative embodiment. In this example, inner mold line machine 300 as seen from a bottom view in the direction of lines 4-4 in FIG. 3.

As depicted in this example, movement system 312 is configured to move offset swage assembly 310 about rotation axis 324 with bearing assembly 332.

As depicted, gear ring 334 is connected to platform 308. As depicted, gear ring 334 is moveably connected to platform 308.

In this illustrative example, offset swage assembly 310, vacuum system 314, and camera 316 are shown as connected to gear ring 334. In other words, these components are configured to rotate around rotation axis 324 as gear ring 334 rotates about rotation axis 324. The different components may be directly or indirectly connected to gear ring 334.

As depicted, drive 400 is a motorized unit configured to cause offset swage assembly 310, vacuum system 314, and camera 316 to rotate around rotation axis 324 by moving gear ring 334.

In this illustrative example, laser sensor 402 is adjacent to camera 316. Laser sensor 402 detects the distance from laser sensor 402 to an inner mold line surface (not shown).

In this example, bearing assembly 332 with gear ring 334, outer ring 336, and drive 400 allows for 360 degrees of rotation of offset swage assembly 310, vacuum system 314, camera 316, and laser sensor 338 around rotation axis 324. In this manner, offset swage assembly 310 is configured to swing into a desired position offset from rotation axis 324.

Figure 5:
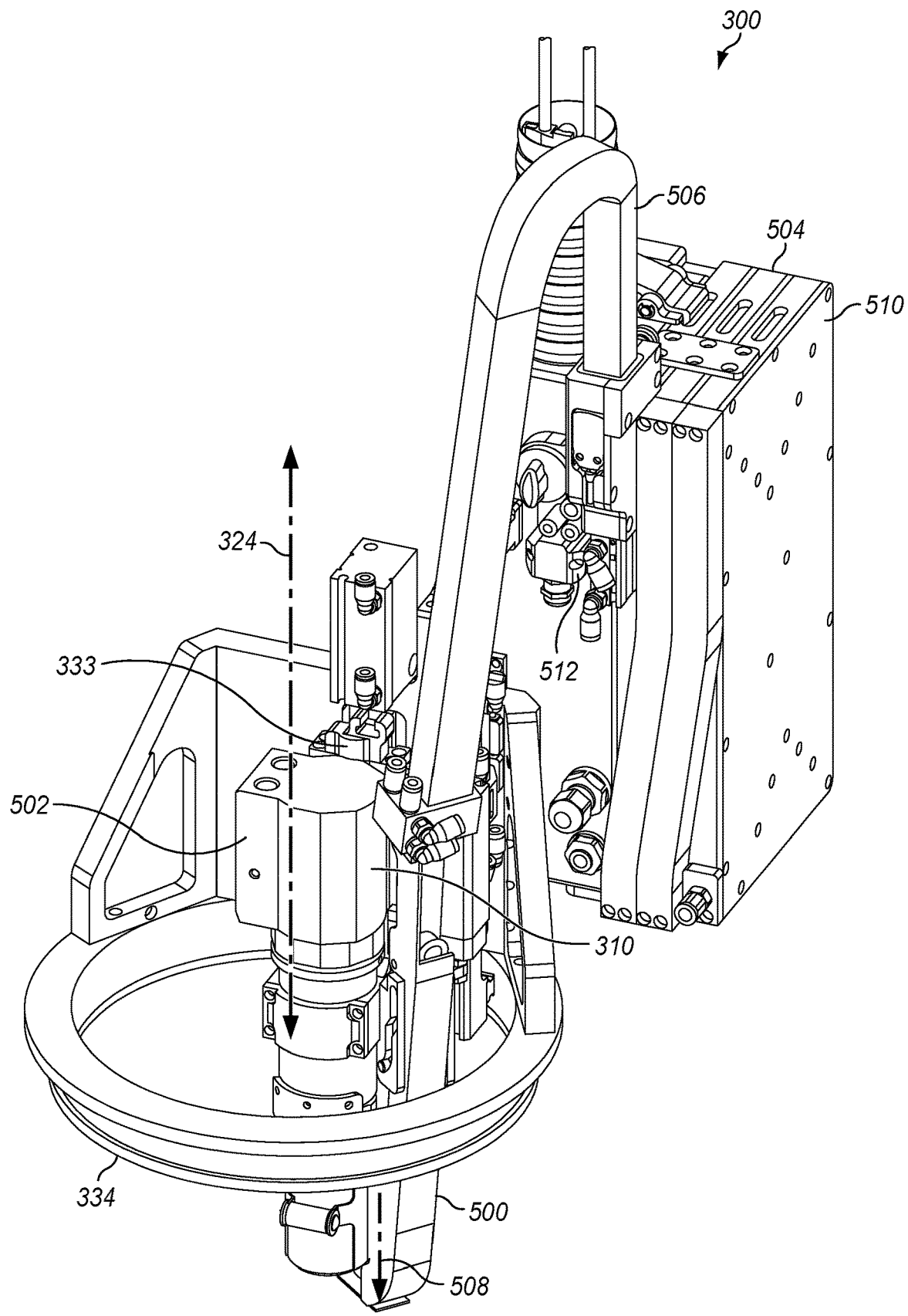
FIG. 5 is an illustration of a portion of an inner mold line machine in accordance with an illustrative embodiment.

With reference to FIG. 5, an illustration of a portion of inner mold line machine 300 is depicted in accordance with an illustrative embodiment. In this illustrative example, offset swage assembly 310 is within gear ring 334 while other components for inner mold line machine 300 are not shown. This partial illustration is employed to describe components in offset swage assembly 310 in a manner that avoids obscuring the illustration and description of these components.

In this illustrative example, offset swage assembly 310 comprises a number of different components. As depicted, offset swage assembly 310 includes collar holder 500, collar swage 502, and magazine 504. Collar holder 500 is an example of one implementation for collar holder 134 shown in block form in FIG. 1. Collar swage 502 is an example of an implementation for engager 136 shown in block form in FIG. 1.

In this illustrative example, collar holder 500 is configured to receive a collar (not shown) from magazine 504 and hold the collar for swaging by collar swage 502. As depicted, magazine 504 is connected to collar holder 500 by tube 506. Magazine 504 holds collars (not shown).

As depicted, collar holder 500 holds a collar (not shown) on axis 508 which is parallel to rotation axis 324. As shown in this illustrative example, offset swage assembly 310 is configured to rotate about rotation axis 324 when gear ring 334 is moved. As offset swage assembly 310 rotates, axis 508 rotates about rotation axis 324 and can move from side to side of rotation axis 324.

In the depicted example, magazine 504 in FIG. 5 takes the form of one or more cartridges 510. Collars (not shown) stored in cartridges 510 can be fed from cartridges 510 to collar holder 500 using collar injector 512. Collar injector 512 can be a cam or cam activated collar feed mechanism and may use compressed air to feed a collar (not shown) to collar holder 500 from magazine 504 via tube 506. In this manner, cartridges 510 function as an onboard supply of collars for offset swage assembly 310 in inner mold line machine 300. In further embodiments, other types of collar delivery systems may be utilized, such as a remote bowl feeder system.

The illustration of inner mold line machine 300 in FIGS. 3-5 is not meant to limit the manner in which an inner mold line machine or other machine employing an collar installer may be implemented. For example, other types of fasteners may be used in place of offset swage assembly 310 in which pins and collars are inserted by swaging. For example, another type of collar installer may cause engagement by rotating at least one of a collar or a bolt such that threads or grooves in these components engage each other.

In another illustrative example, other types of rotational systems may be implemented in which other degrees of movement are present other than 360 degrees. In another illustrative example, offset swage assembly 310 moves 90 degrees, 180 degrees, 270 degrees, or some other amounts of movement about rotation axis 324. In yet another illustrative example, vacuum system 314 may be omitted from inner mold line machine 300. In still another illustrative example, these components may be implemented as part of an outer mold line machine.

Figure 6:
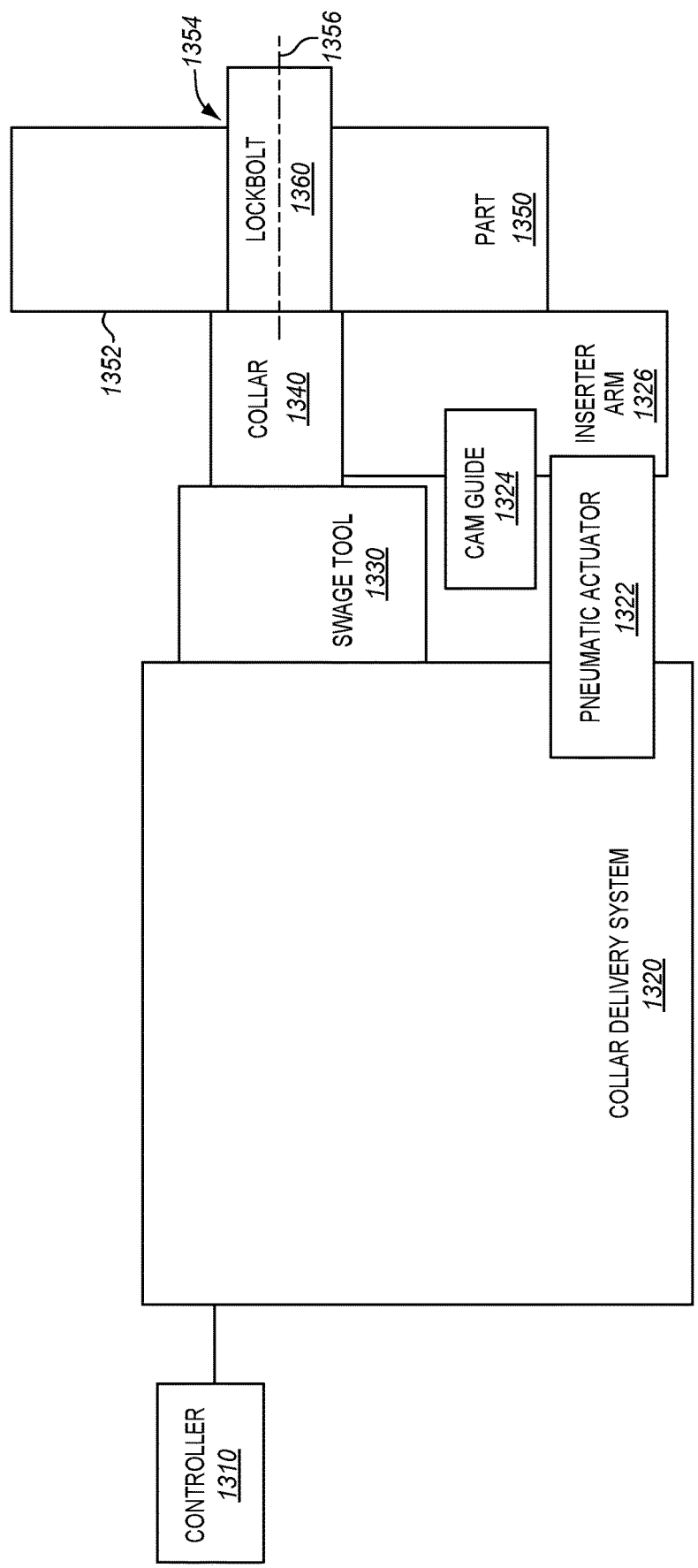
FIG. 6 is a block diagram of a collar delivery system in accordance with an illustrative embodiment.
Figure 7:
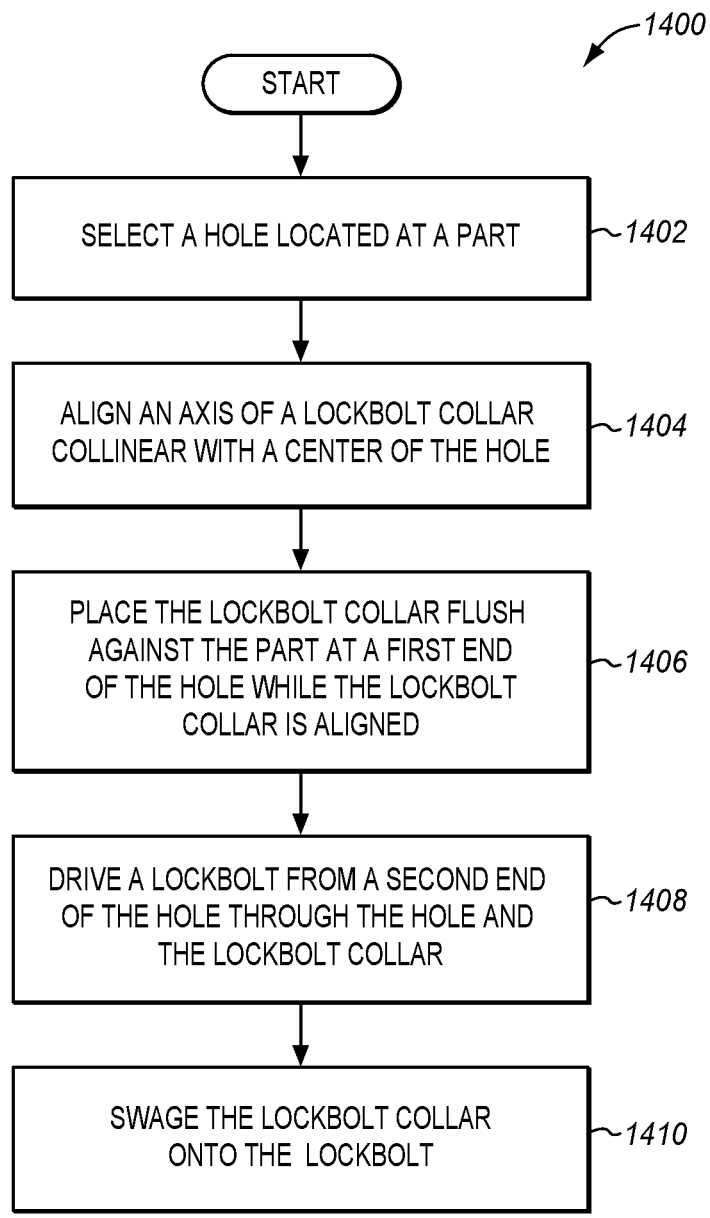
FIG. 7 is a flowchart illustrating a method for supplying a collar to a swage tool in accordance with an illustrative embodiment.
Figure 8:
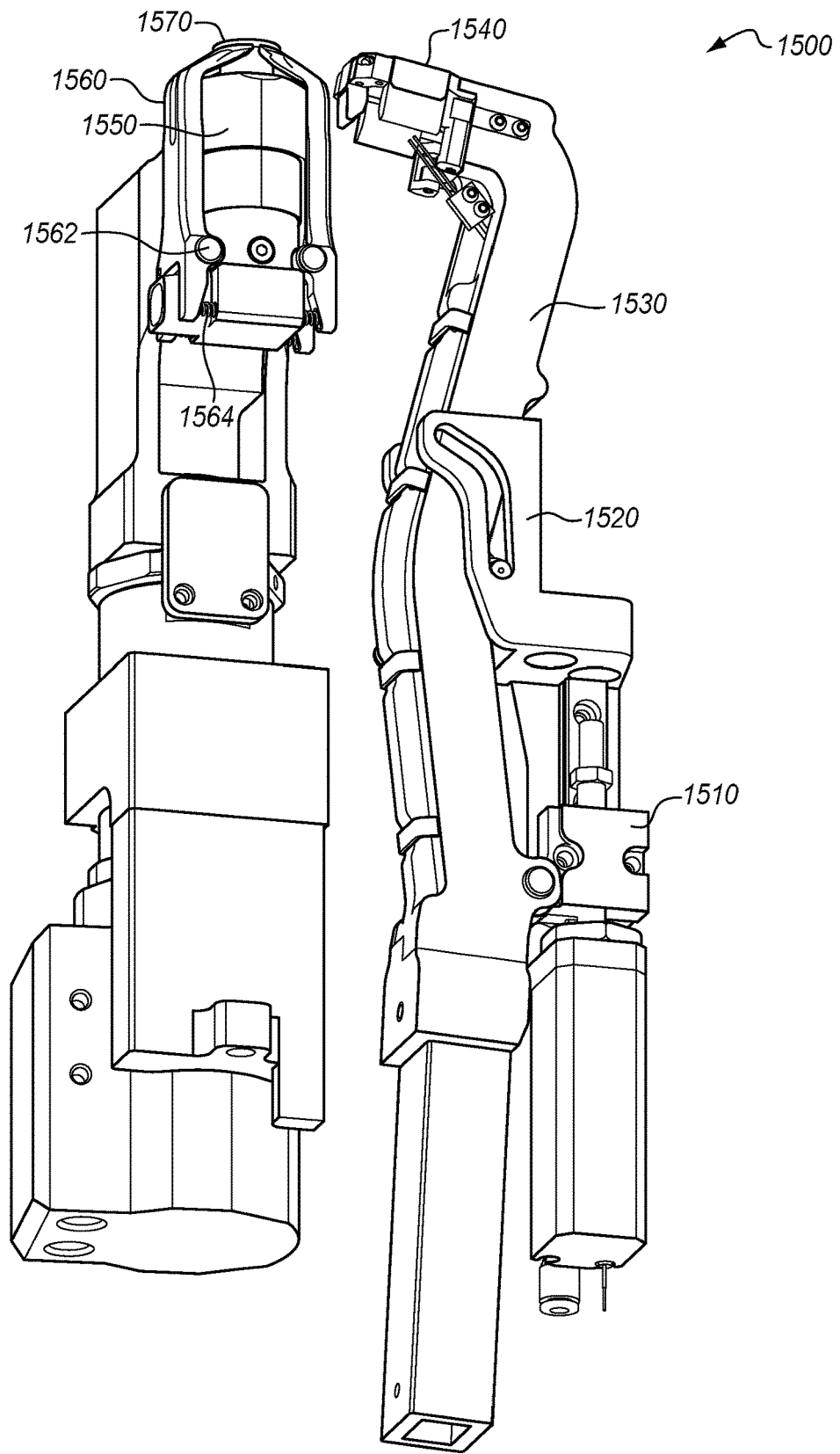
FIG. 8 is a diagram depicting a first collar delivery system in accordance with an illustrative embodiment.

FIGS. 6-8 illustrate but one of countless automated fastener installation tools that may be monitored in accordance with the inventive processes described herein. Thus, FIGS. 6-8 shall be considered illustrative of just one of innumerable variations in tooling that may benefit from application of the inventive process.

FIGS. 6-21 illustrate exemplary collar delivery systems for providing collars without an airgap to offset swage tools, in order to enhance the ability of swage tools to install fasteners in low clearance environments. Specifically, FIGS. 6-7 illustrate conceptual embodiments of collar delivery systems and methods for using such systems, while FIGS. 8-21 illustrate operation of a specific illustrative collar delivery system.

FIG. 6 is a block diagram of a collar delivery system 1300 in an illustrative embodiment. Collar delivery system 1300 comprises any system, device, or component operable to deliver lockbolt collars to a swage tool. In this embodiment, collar delivery system 1300 includes pneumatic actuator 1322. Pneumatic actuator 1322 applies pressure that displaces collar delivery system 1320 as collar delivery system 1320 supplies a collar 1340 through inserter arm 1326 to a swage tool 1330. Swage tool 1330 may apply the collar 1340 to a part 1350 that will receive a lockbolt 1360. Specifically, the collar 1340 may be placed in alignment with a centerline 1356 of a hole 1354 within the part 1350. The collar 1340 may be swaged onto the lockbolt 1360 in order to complete installation of a fastener. A cam guide 1324 directs the motion of collar delivery system 1320 during the delivery process prior to the lockbolt 1360 piercing the surface 1352 of part 1350.

Controller 1310 manages pneumatic actuator 1322 based on any suitable instructions stored in a Numerical Control (NC) program. Controller 1310 may be implemented, for example, as custom circuitry, as a hardware processor executing programmed instructions, or some combination thereof.

Illustrative details of the operation of collar delivery system 1300 will be discussed with regard to FIG. 7. Assume, for this embodiment, that swage tool 1330 has been aligned with a location where a fastener will be installed at part 1350, and that a hole has been drilled through the part 1350.

FIG. 7 is a flowchart illustrating a method 1400 for supplying a collar to a swage tool in an illustrative embodiment. The steps of method 1400 are described with reference to collar delivery system 1300 of FIG. 13, but those skilled in the art will appreciate that method 1400 may be performed in other systems. The steps of the flowcharts described herein are not all inclusive and may include other steps not shown. The steps described herein may also be performed in an alternative order.

In step 1402, controller 1310 selects a hole located at part 1350, such as a hole that was just drilled by an Outer Mold Line (OML) tool. The hole may be selected, for example, based on instructions in an NC program, based on scanning performed by an Inner Mold Line (IML) device or sensor, etc.

In step 1404, controller 1310 directs swage tool 1330 to align an axis of a lockbolt collar (e.g., collar 1340) to be collinear with a centerline 16356 of the hole 1354 at surface 1352 of part 1350. This may be performed based on input from a sensor system, such as any sensor system described above. For example, a visual or laser sensing system may be utilized to receive feedback indicating axial alignment. In short, when alignment is completed, the point at centerline 1356 of hole 1354 that intersects the plane defined by surface 1352 is aligned (e.g., such that the point intersects an axis of the collar 1340 or is collinear with the axis of the collar 1340).

In step 1406, controller 1310 directs the swage tool 1330 to place the lockbolt collar flush against the part 1350 at a first end of the hole while the lockbolt collar is aligned. In one illustrative embodiment, step 1406 may comprise pressing swage tool 1330 into collar 1340 while collar 1340 is held against part 1350, although other techniques may be used, so long as an axis of the collar and centerline 1356 of hole 1354 are intersect at the surface 1352 (i.e., the IML) of part 1350.

In step 1408, controller 1310 directs the swage tool 1330 to drive a lockbolt 1360 from a second end (e.g., OML) of the hole through the hole and the lockbolt collar (e.g., while the lockbolt collar is flush against the part 1350). After lockbolt 1360 has been driven through the hole, a head of lockbolt 1360 (not shown) may either protrude from the hole such that a flange of a crown type head of the lockbolt 1360 sits on the OML, or is flush with the hole (e.g., countersunk into the hole). By driving the lockbolt 1360 through the hole after the lockbolt collar has already been aligned with the hole, swage tool 1330 ensures that the lockbolt 1360 proceeds through both the hole and the collar without issue. Thus, swage tool 1330 holds the collar 1340 while the lockbolt 1360 is driven through the part 1350 and subsequently while the lockbolt exits part 1350 and pierces through the collar 1340. Furthermore, since the collar 1340 is held flush against part 1350, fasteners may be installed in low clearance areas at part 1350. Thus, collar delivery system 1320 may be used if there is low vertical clearance at an IML of the part 1350. This may be beneficial in cases where there is an overhang above an IML of the part 1350.

Additionally, the collar installation arrangement shown in FIG. 6 allows placement of a collar onto a lockbolt at a location where there is certainty of the location of the lockbolt shank. This IML surface placement is repeatable and accurate, whereas driving a lockbolt fully into a hole and then locating a collar onto the end of the lockbolt would require a level of scanning and placement that overhangs and sensors may not be able to achieve and meet a desired rate desired for automation of the process. This may help to address problems wherein an angle of a lockbolt is skewed relative to a desired location/orientation, resulting in placement difficulty when using prior techniques. The method discussed herein allows design tolerance for the angularity of a hole and/or lockbolt relative to optimal to be greater than otherwise possible while still meeting a desired automation rate and design requirements.

In step 1410, swage tool 1330 swages the lockbolt collar onto the lockbolt. This completes installation of a fastener, at which time the controller 1310 may direct the swage tool to proceed to a location where a next fastener will be installed.

Method 1400 provides a technical benefit by placing collars flush with holes prior to lockbolt installation. Because the collars are placed before the lockbolts, the likelihood of the collar aligning with the lockbolt are enhanced. Specifically, the inventive systems and techniques described herein allow the design tolerance for the angularity of the hole relative to optimal to be greater than otherwise possible while still meeting the desired automation rate. Furthermore, because the collars are placed flush against the part (e.g., without an air gap between a swage nose (e.g., as depicted by swage nose 1550 of FIG. 15 and the collar), swaging operations may be performed in vertical clearance with respect to an the IML surface of the part.

FIGS. 8-21 are diagrams illustrating a collar delivery system 1500 supplying a collar 1570 in an illustrative embodiment. FIG. 8 shows that collar delivery system 1500 includes a pneumatic actuator 1510, a cam 1520, a collar arm 1530, and collar feed fingers 1540. These components feed collars to a swage nose 1550 which will swage the collar onto a lockbolt. Fingers 1560 (e.g., a pair of fingers that are opposed) apply force that holds collar 1570 in position while swage nose 1550 moves into position for swaging. As swage nose 1550 performs swaging, fingers 1560 deflect by rotating about hinges 1562, and then as swage nose 1550 retracts, biasing devices 1564 (e.g., springs) return the fingers 1560 to their original position. FIGS. 9-21 illustrate the process in detail.

Figure 9:
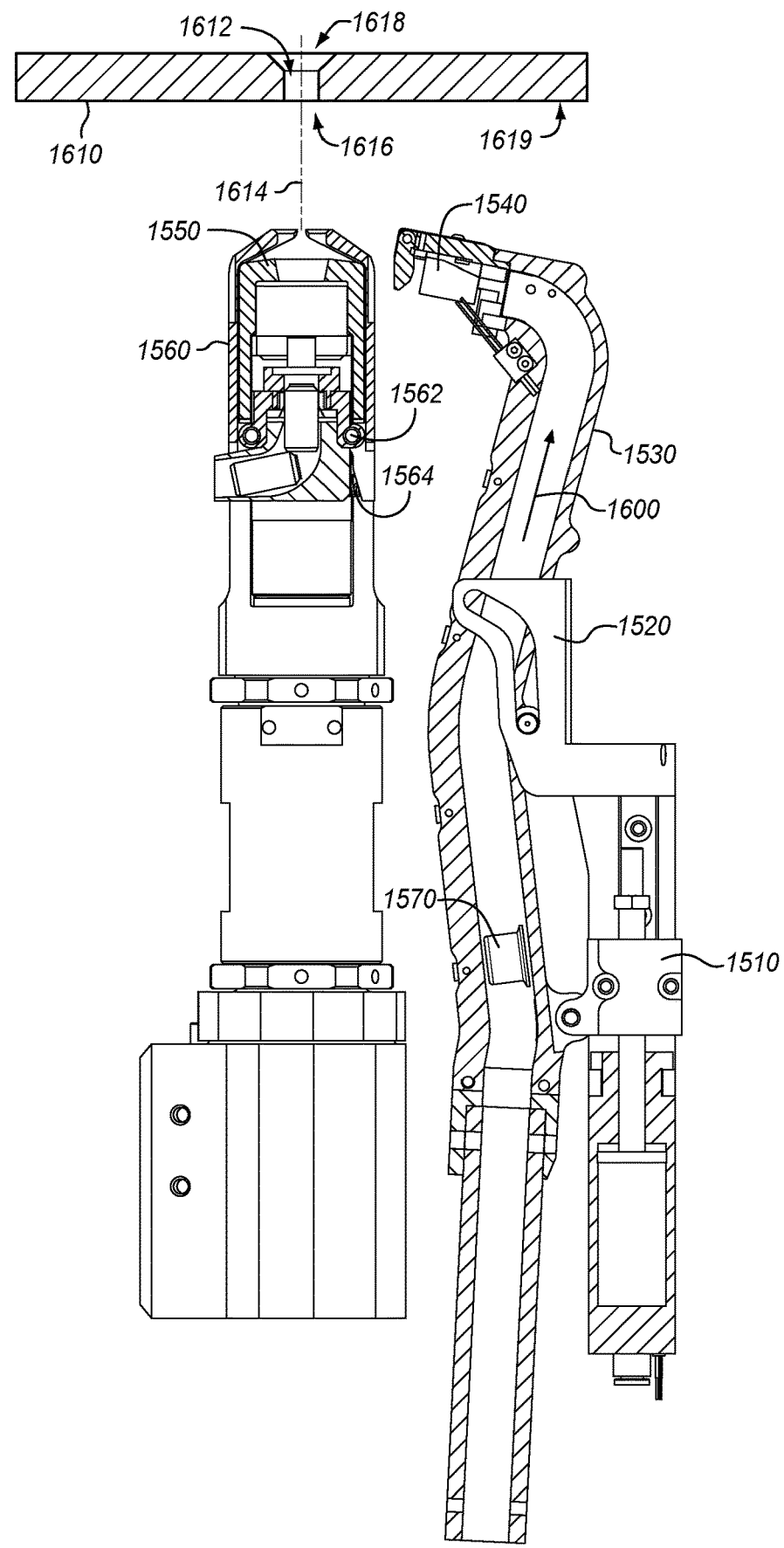
FIG. 9 is a cut-through diagram depicting a first collar delivery system preparing for fastener installation at a hole in accordance with an illustrative embodiment.

In FIG. 9, swage nose 1550 has been moved into position beneath a hole 1612 having a centerline 1614 at a part 1610. Surface 1619 of part 1610 comprises an IML, surface of part 1610. In the following FIGS. 9-2821 collar 1570 will be placed flush against a first end 1616 of hole 1612 at surface 1619 (i.e., an IML surface), a lockbolt will be driven through a second end 1618 of hole 1612 (i.e., an OML surface), and swage nose 1550 will swage the collar onto the lockbolt.

Figure 10:
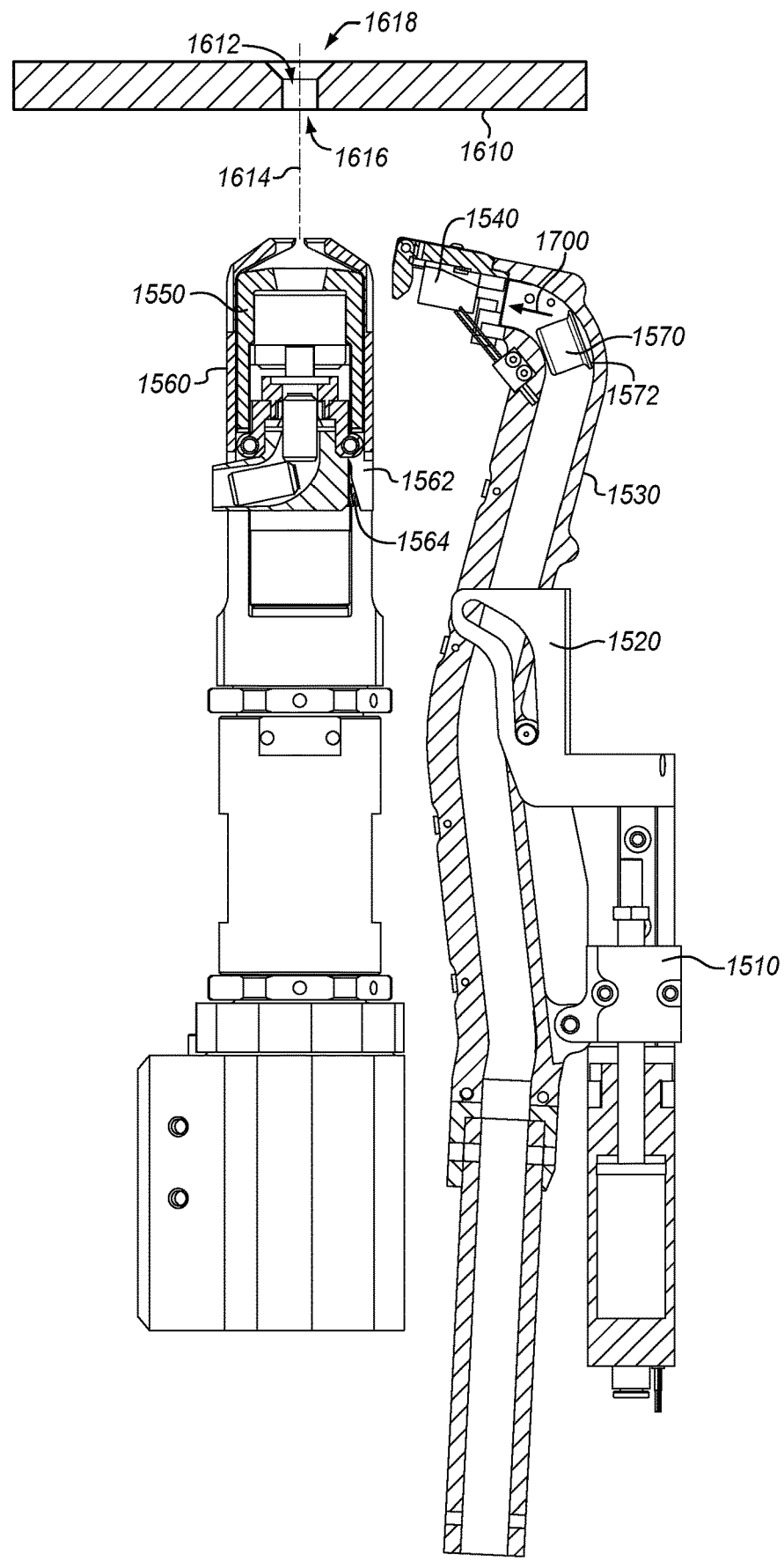
FIG. 10 is a cut-through diagram depicting movement of a collar for a first collar delivery system in accordance with an illustrative embodiment.
Figure 11:
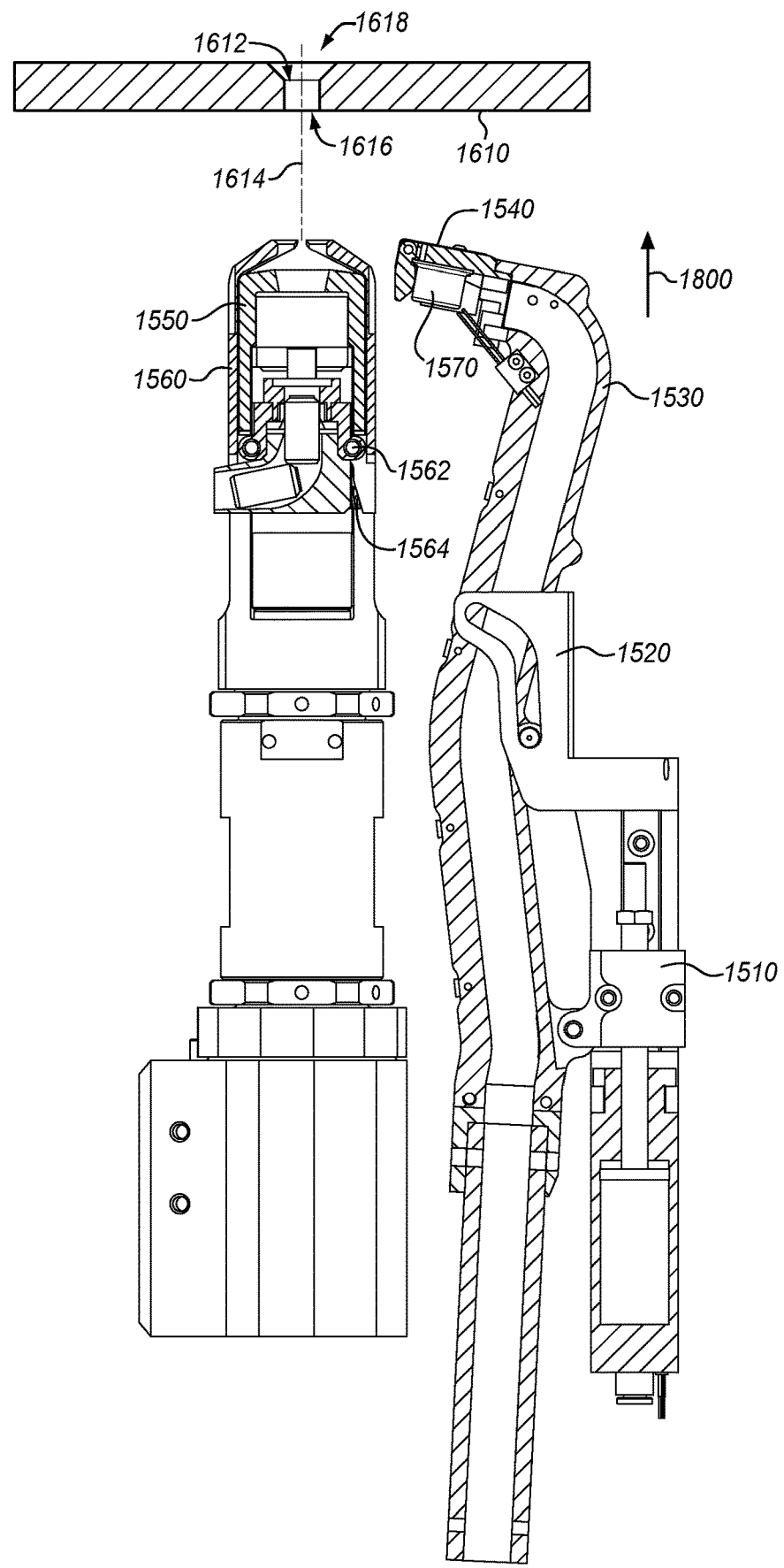
FIG. 11 is a cut-through diagram depicting a collar delivered to collar feed fingers in accordance with an illustrative embodiment.
Figure 12:
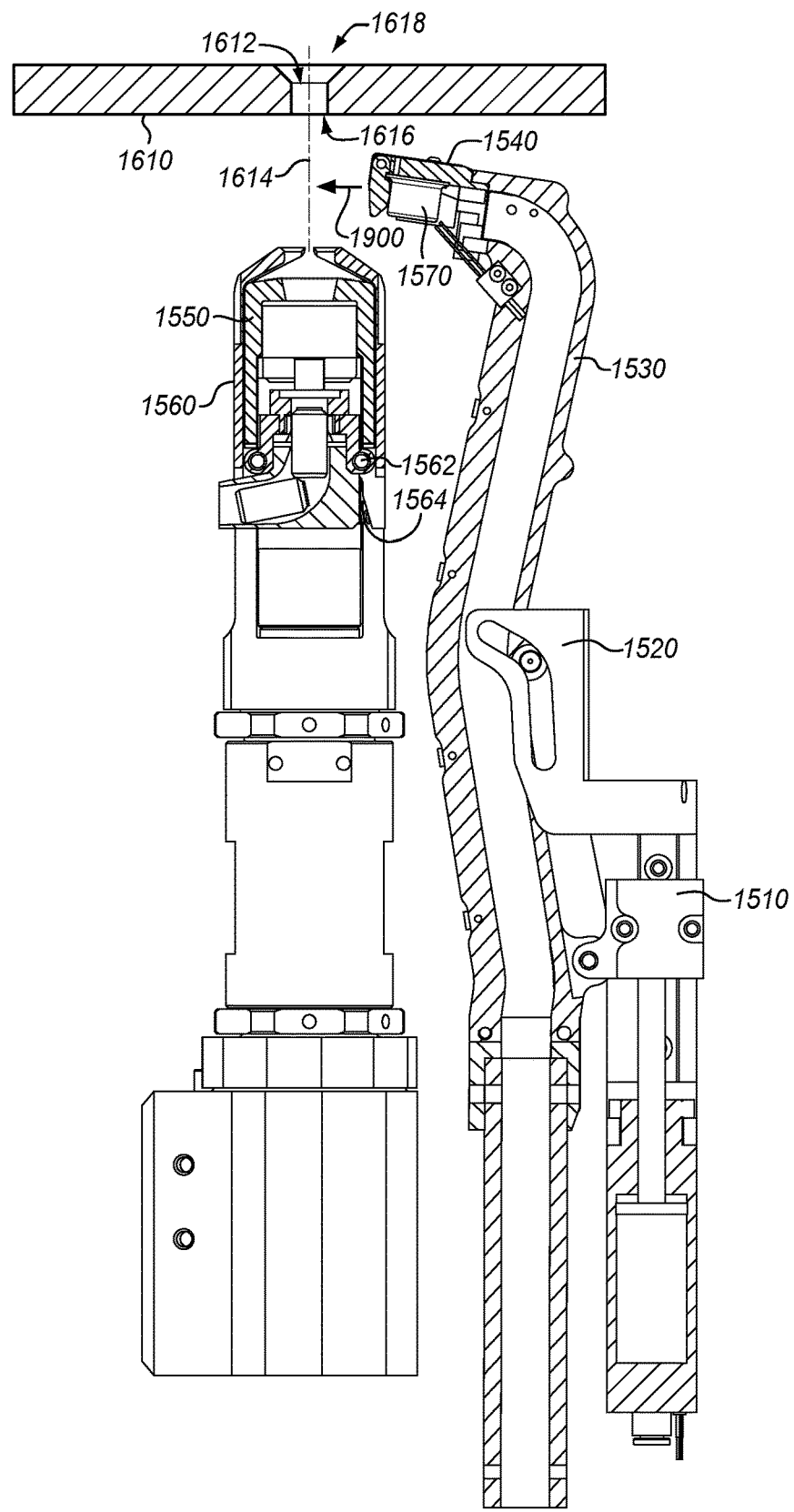
FIG. 12 is a cut-through diagram depicting a first collar delivery system moved upwards in accordance with an illustrative embodiment.

As shown in FIG. 9, collar 1570 is transported in direction 1600 through collar arm 1530. At this time, flange 1572 is located on a right side of collar 1570, and is fed in a manner that rotates collar 1570 to ensure that flange 1572 may be placed flush against surface 1619 of part 1610. In FIG. 10, collar 1570 is transported in direction 1700 to collar feed fingers 1540 as collar 1570 is reoriented to rotate flange 1572 to a top of collar 1570. As shown in these FIGS., movement indicated by an arrow in one FIG. is completed or continued in a following FIG. FIG. 11 illustrates that collar 1570 has reached collar feed fingers 1540 and is ready for delivery to swage nose 1550. Flange 1572 is now positioned at the top of collar 1570. Thus, collar delivery system 1500 is moved upwards in direction 1800 to the position shown in FIG. 12. In FIG. 12, flange 1572 remains in substantially the same orientation. In FIG. 12, collar delivery system 1500 is laterally displaced in direction 1900 to the position shown in FIG. 13, wherein collar 1570 is poised above swage nose 1550. When aligned in this manner, axis 2010 of collar 1570 is collinear with the point of centerline 1614 of hole 1612 that intersects the plane defined by surface 1619. Furthermore, flange 1572 is substantially parallel with surface 1619, and will remain in this orientation for the remaining portion of the swaging process.

Figure 13:
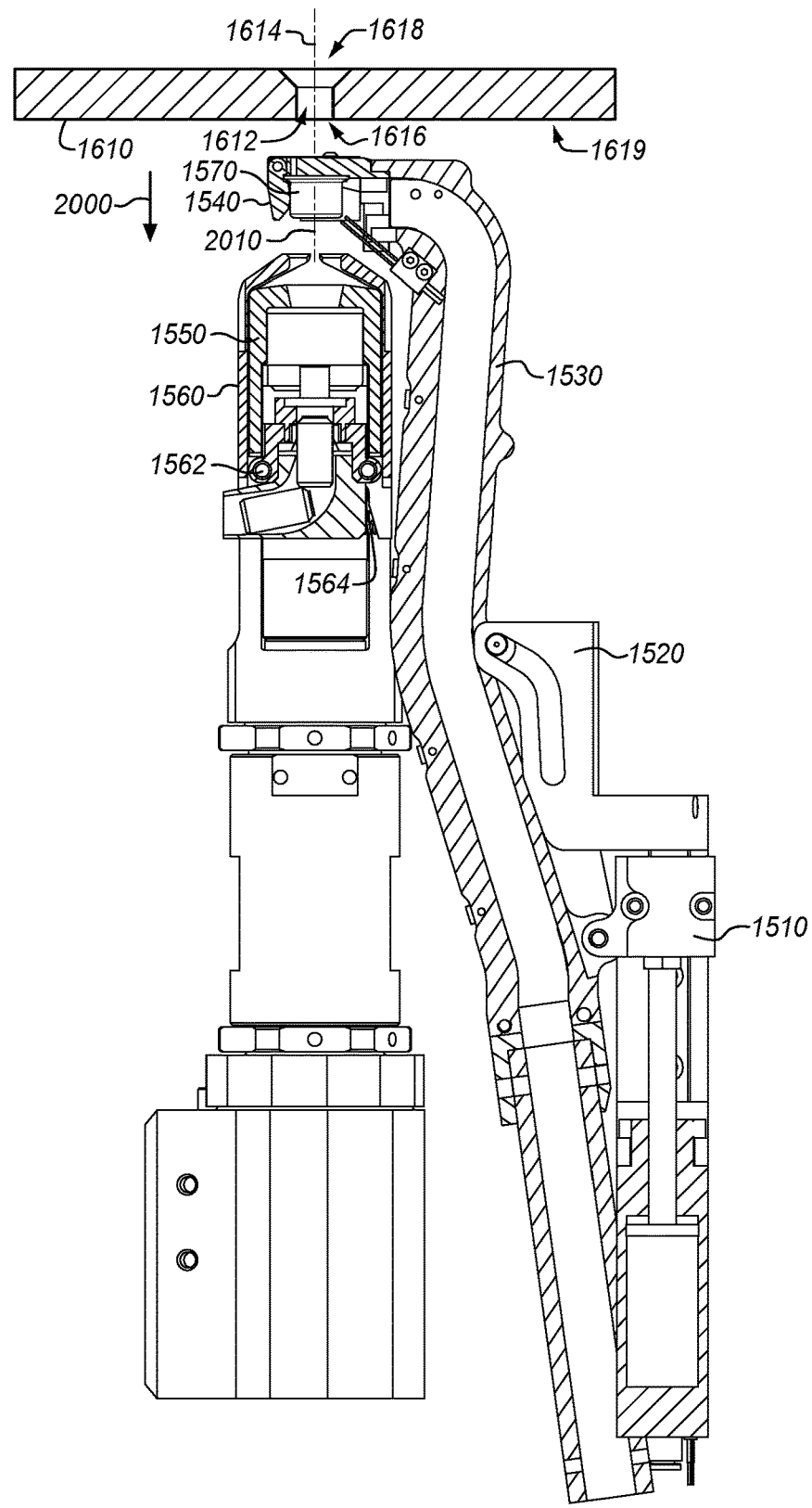
FIG. 13 is a cut-through diagram depicting a first collar delivery system preparing for delivery of a collar to fingers at a swage nose in accordance with an illustrative embodiment.
Figure 14:
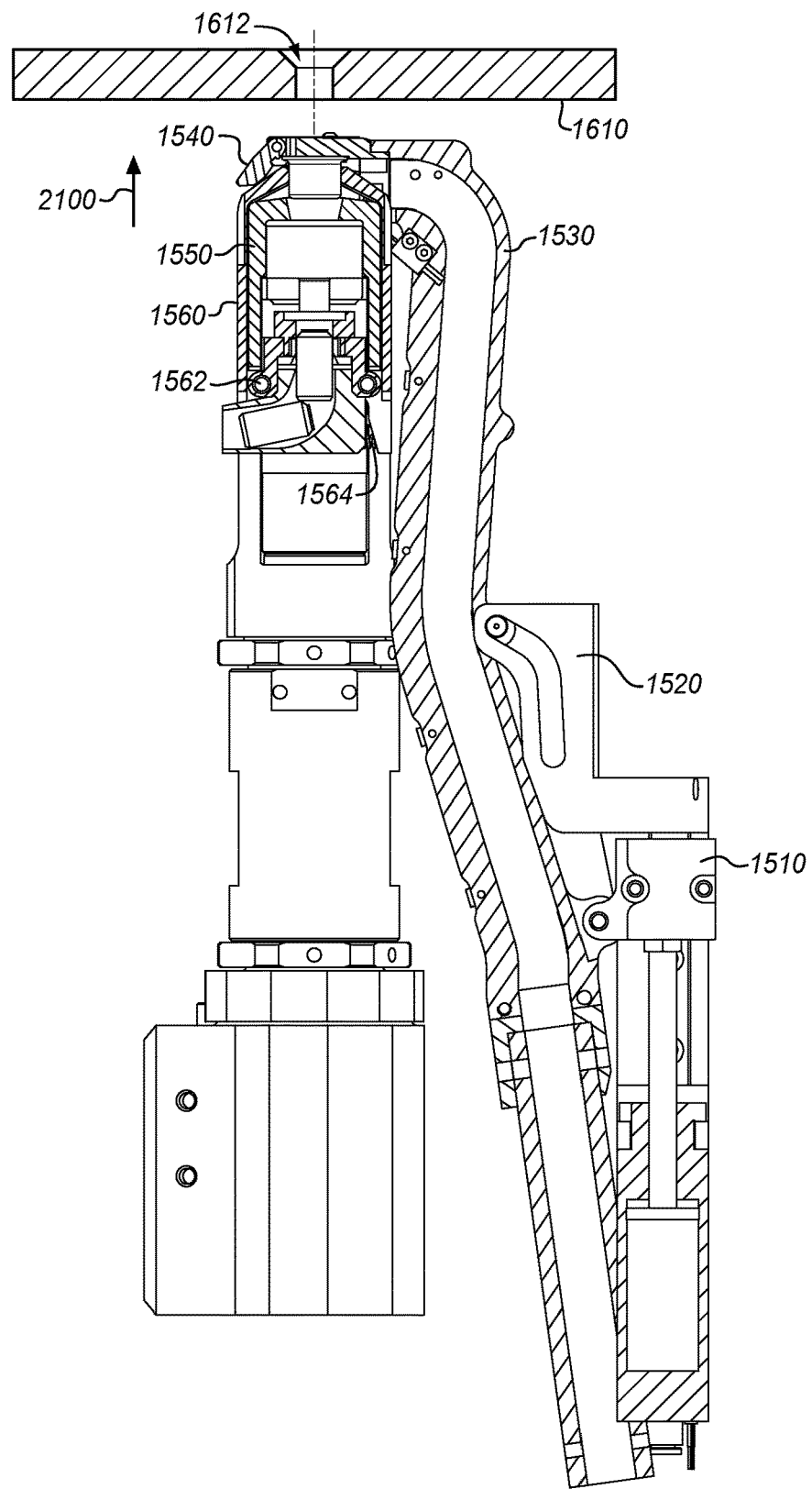
FIG. 14 is a cut-through diagram depicting a first collar delivery system having provided a collar to fingers at a swage nose in accordance with an illustrative embodiment.
Figure 15:
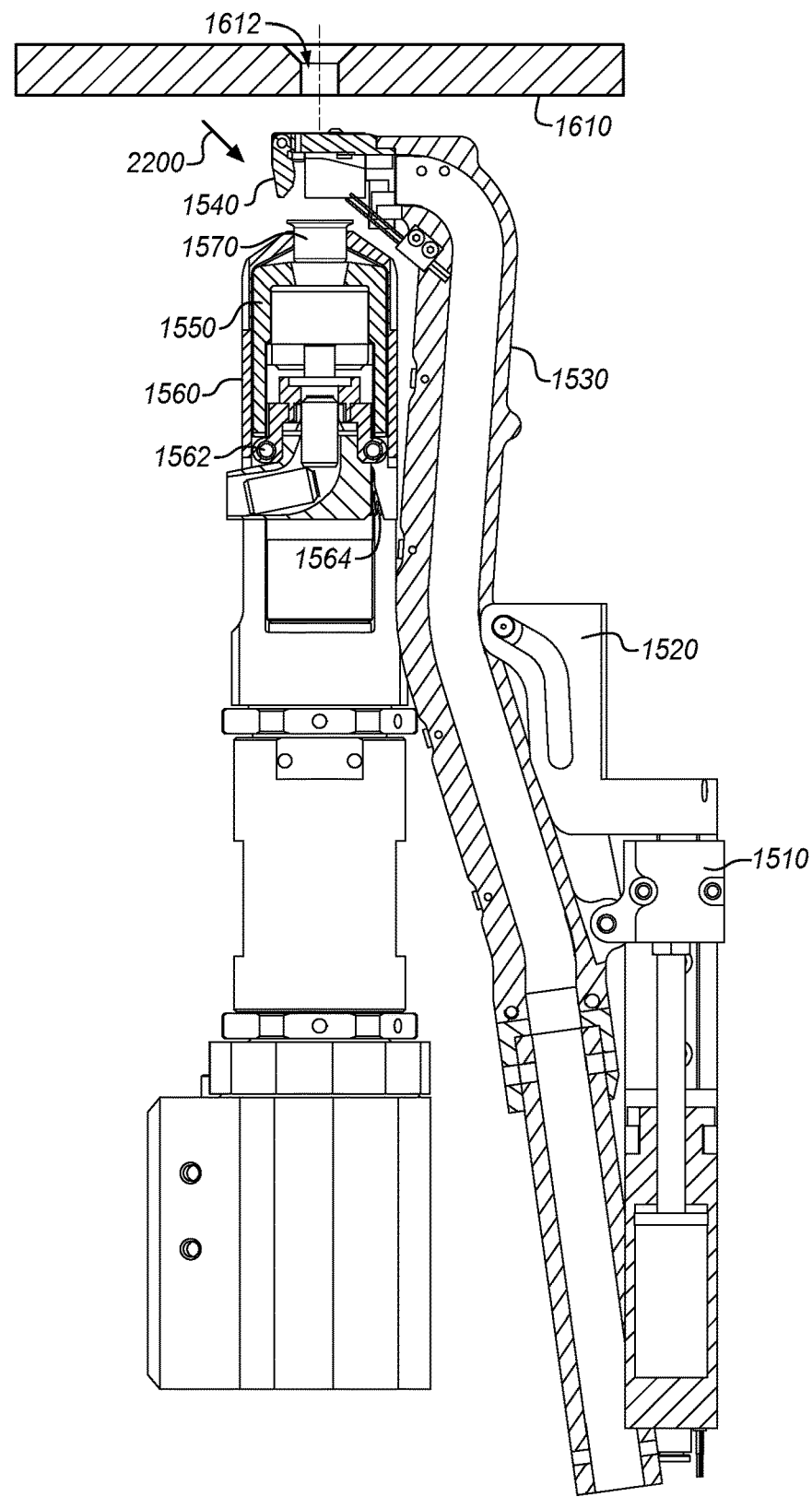
FIG. 15 is a cut-through diagram depicting a first collar delivery system having retracted from a swage nose in accordance with an illustrative embodiment.

In FIG. 13, collar delivery system 1500 is moved downwards in direction 2000 to deposit collar 1570 into fingers 1560, which are biased by biasing devices 1564 to apply gripping force to collar 1570. Collar feed fingers 1540 will release their grip on collar 1570 after collar 1570 is secured in place by fingers 1560, as depicted in FIG. 14. In FIG. 14, collar delivery system 1500 is displaced upwards in direction 2100, and in FIG. 15, collar delivery system 1500 is retracted in direction 2200 away from swage nose 1550. During this time, collar 1570 is secured by gripping forces applied by fingers 1560. Thus, although in this orientation gravity also holds collar 1570 at swage nose 1550, the fingers 1560 (i.e., because flange 1572 rests upon fingers 1560) provide sufficient gripping action to ensure that collar 1570 does not slip off of swage nose 1550 when swage nose 1550 is in alternate orientations such as horizontally oriented, upside-down, etc.

Figure 16:
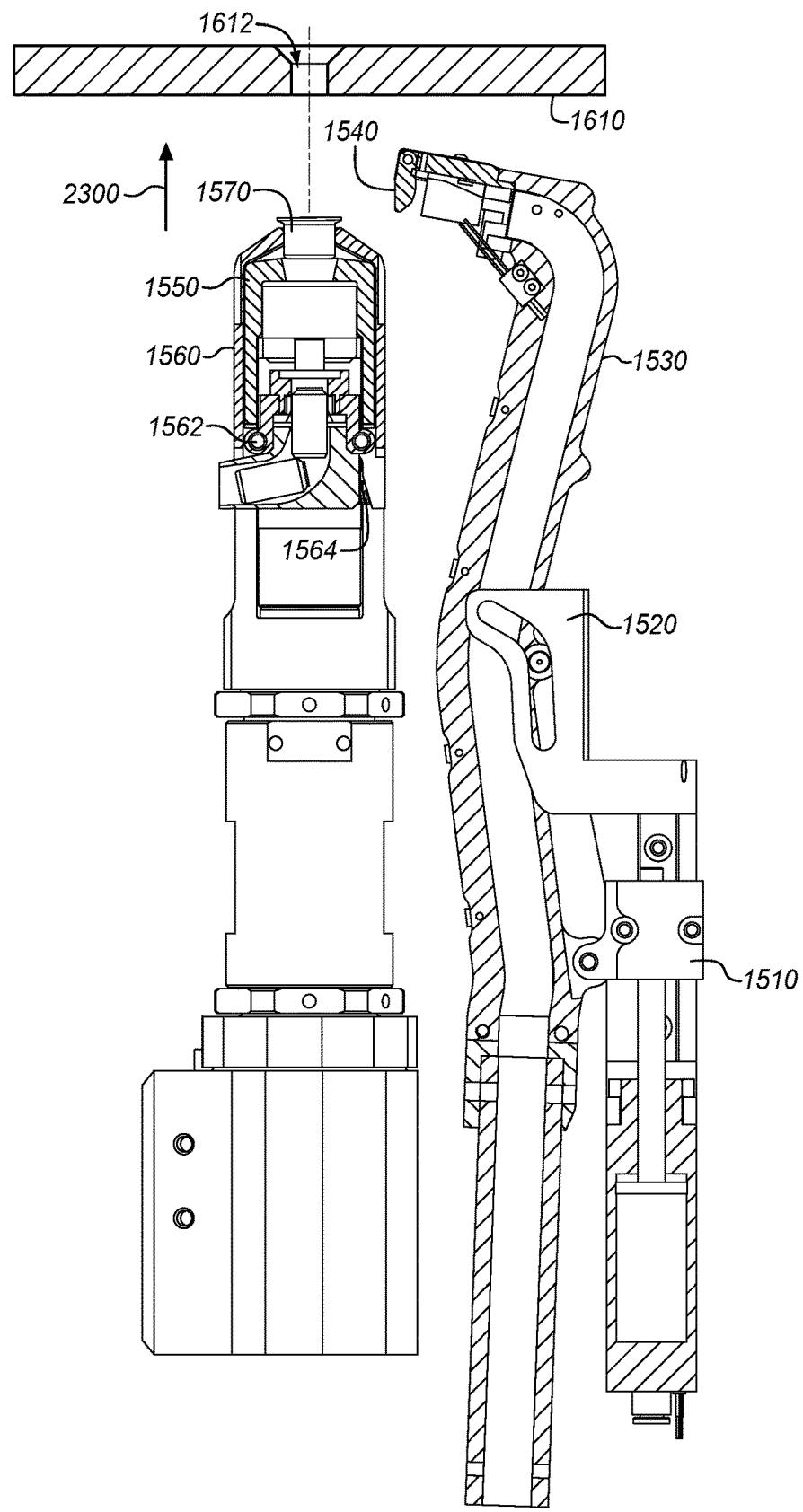
FIG. 16 is a cut-through diagram depicting a swage nose moving towards a hole in accordance with an illustrative embodiment.
Figure 17:
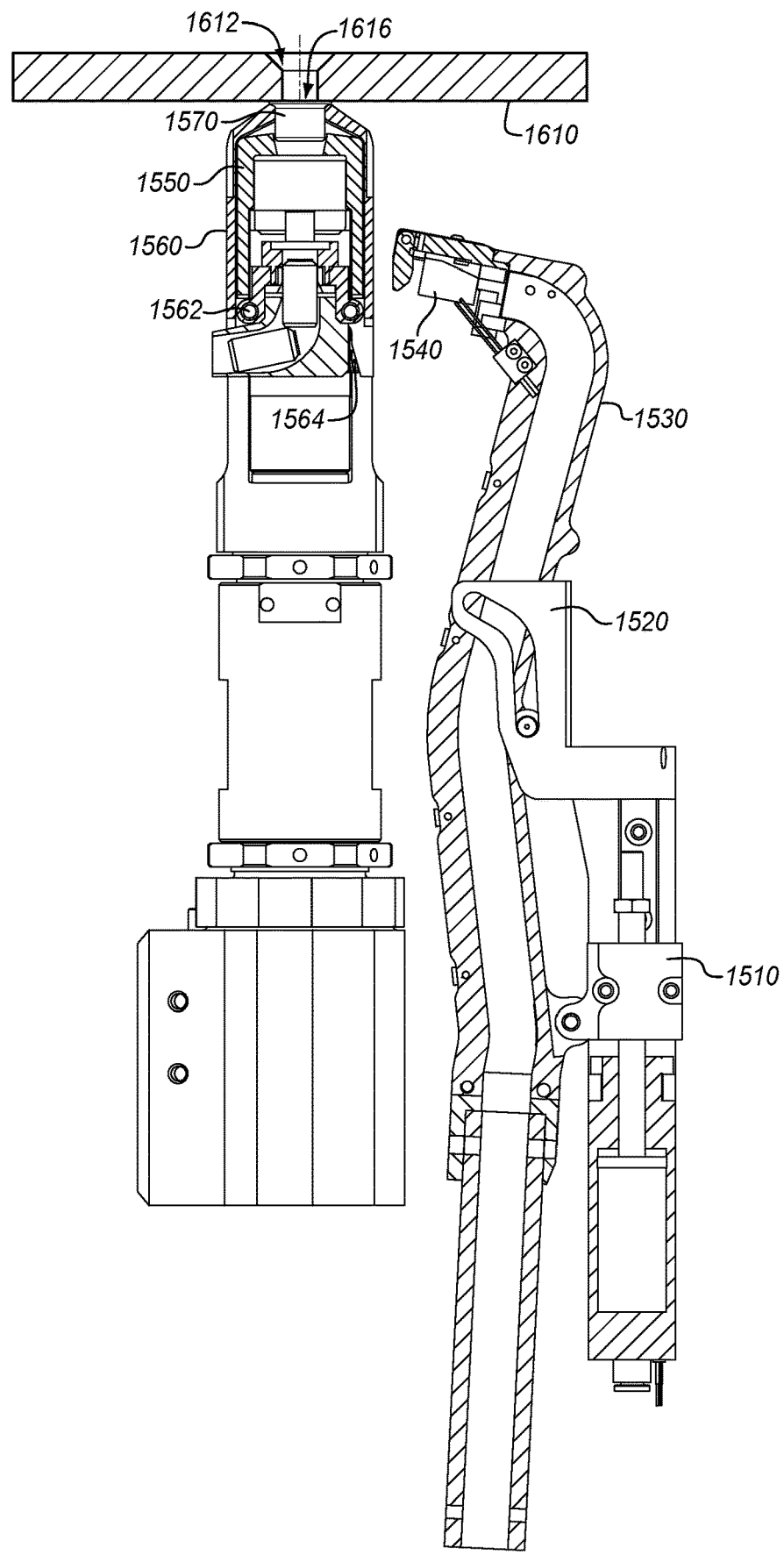
FIG. 17 is a cut-through diagram depicting a swage nose placing a collar flush with a surface in accordance with an illustrative embodiment.

In FIG. 16, swage nose 1550 is moved in direction 2300 towards hole 1612, and in FIG. 17 collar 1570 is held flush against first end 1616 of hole 1612 by swage nose 1550. In FIG. 16, collar delivery system 1500 is shown retracted. At this time, axis 2010 of collar 1570 remains collinear with centerline 1614 of hole 1612 (e.g., as shown in FIG. 13). A lockbolt still has not yet been applied to hole 1612. In instances where the hole 1612 is not fully normal to surface 1619 of part 1610 (e.g., an IML, surface of part 1610, swage nose 1550 need not be tilted, so long as alignment causes the centerline of collar 1570 to intersect with the centerline of hole 1612 that intersects the plane of surface 1619.

Figure 18:
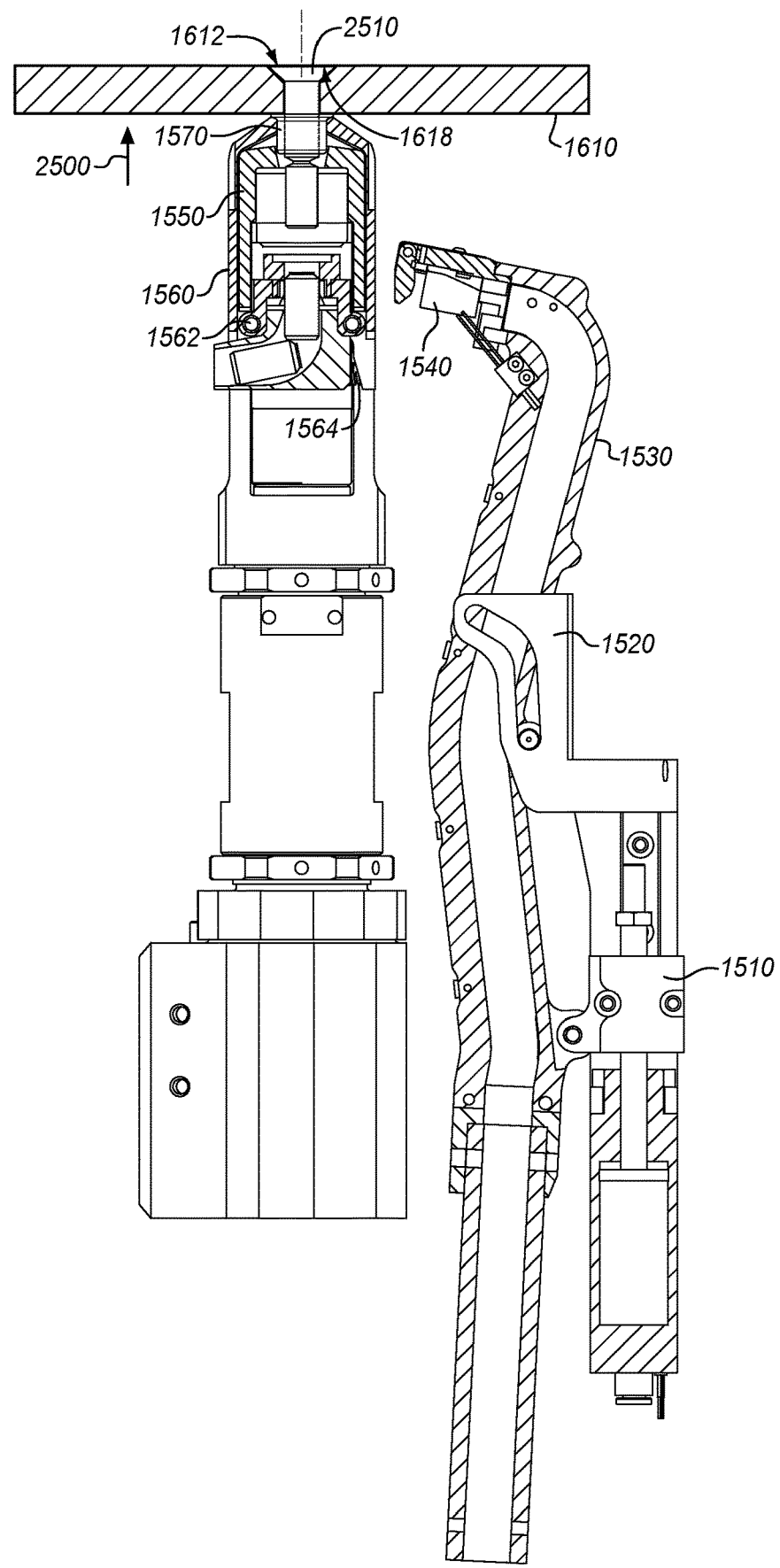
FIG. 18 is a cut-through diagram depicting a lockbolt driven through a hole in accordance with an illustrative embodiment.
Figure 19:
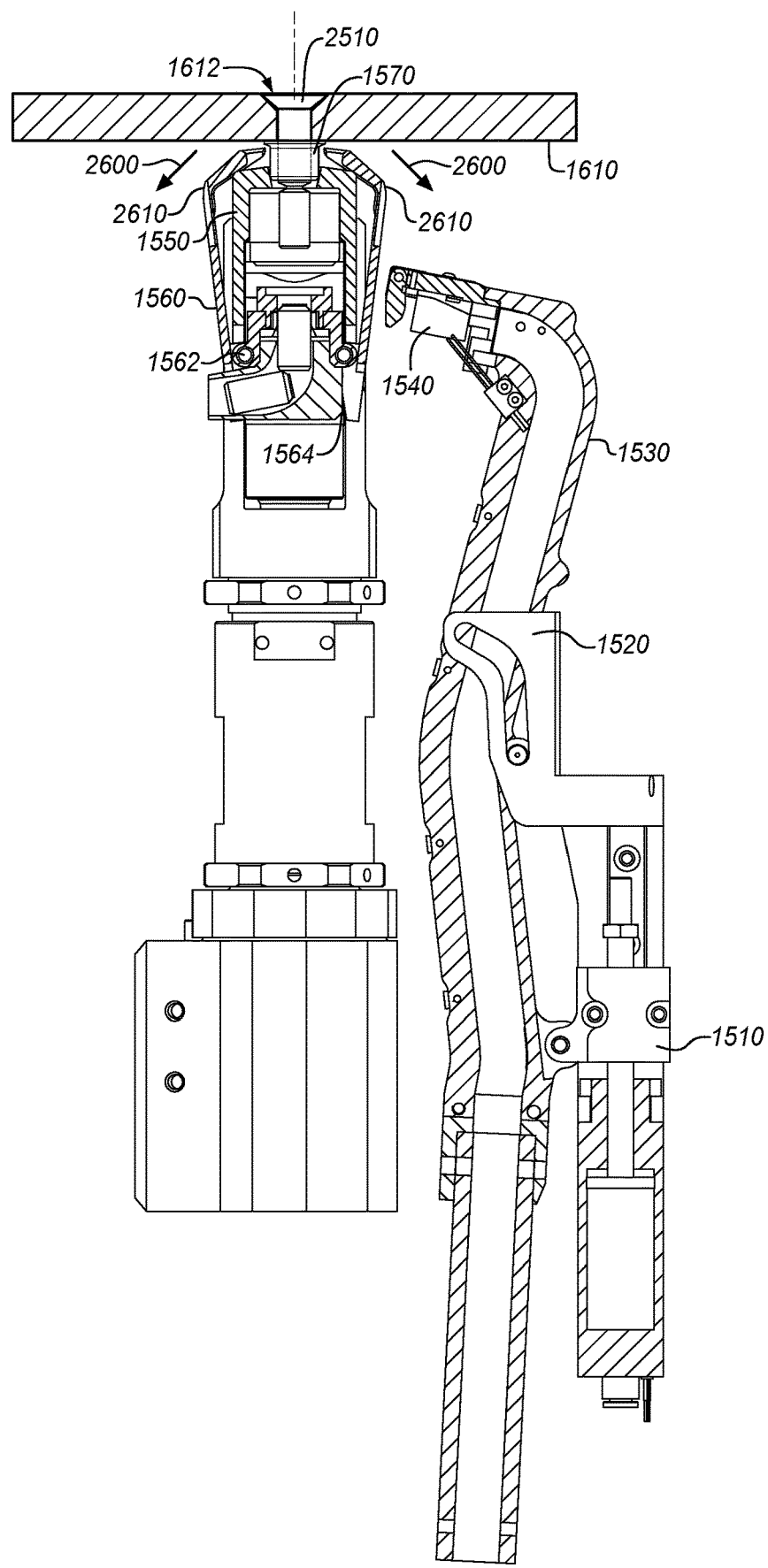
FIG. 19 is a cut-through diagram depicting fingers swinging away from a collar in accordance with an illustrative embodiment.

In FIG. 17, collar delivery system 1500 has retracted sufficiently to prevent interference with swage nose 1550. Thus, swage nose 1550 has placed collar 1570 flush with surface 1619 (i.e., an IML surface) of part 1610. In FIG. 18, lockbolt 2510 is driven through second end 1618 of hole 1612 and through collar 1570. A flange at the collar 1570 keeps the collar from moving when the lockbolt pierces the collar. Swage nose 1550 proceeds to grip a pintail of the lockbolt 2510 and perform swaging of collar 1570 onto lockbolt 2510, moving in direction 2500. As shown in FIG. 19, the motion of swage nose 1550 against inclined ramps 2610 of fingers 1560 causes fingers 1560 to swing about hinges 1562 in direction 2600. Thus, fingers 1560 swing away from collar 1570 as the pintail of lockbolt 2510 is engaged by the swage nose 1550, which ensures that fingers 1560 do not interfere with swaging. This provides a technical benefit of ensuring that swage nose 1550 may be operated in low clearance environments.

Figure 20:
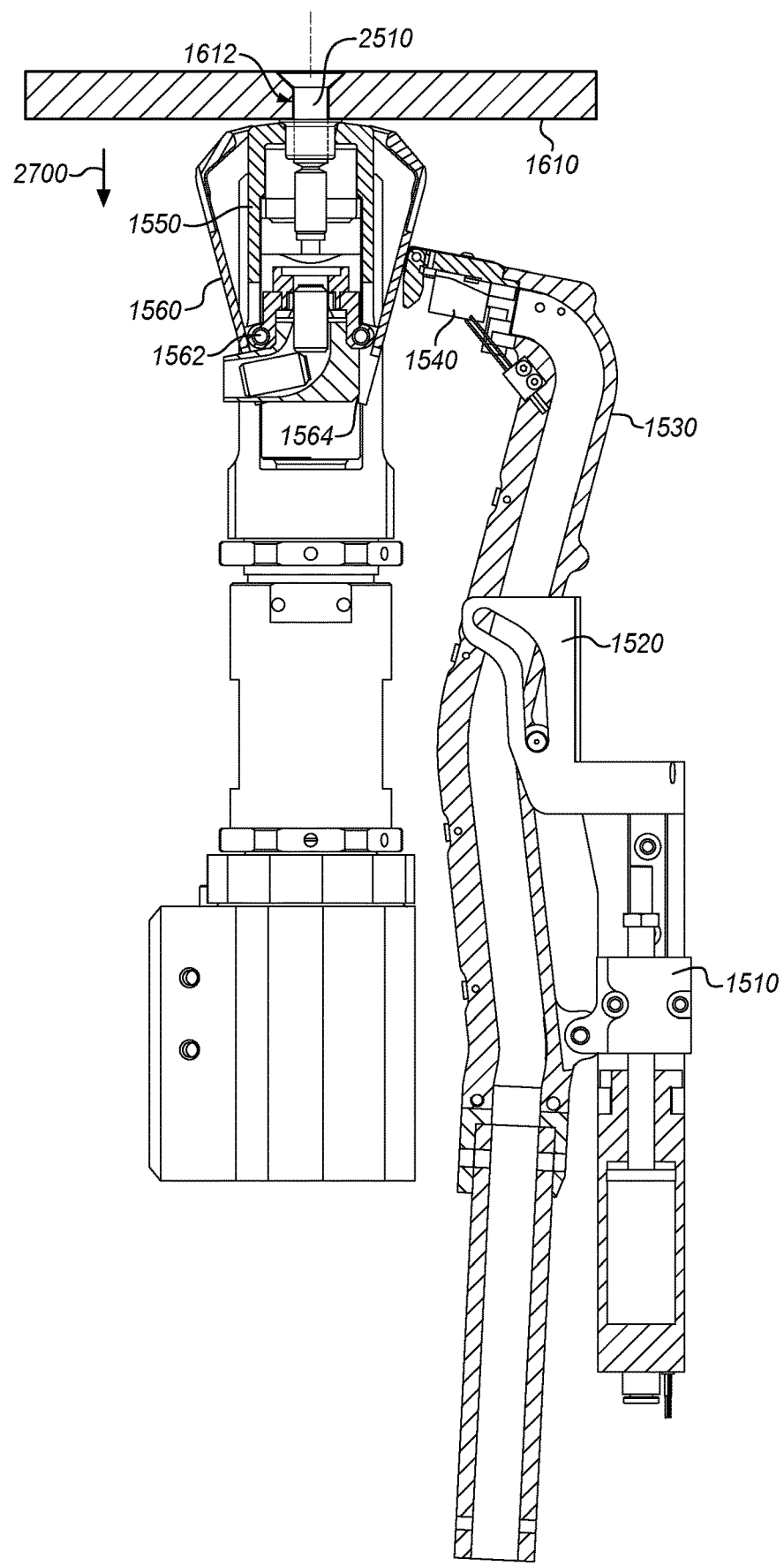
FIG. 20 is a cut-through diagram depicting completion of swaging for a collar in accordance with an illustrative embodiment.
Figure 21:
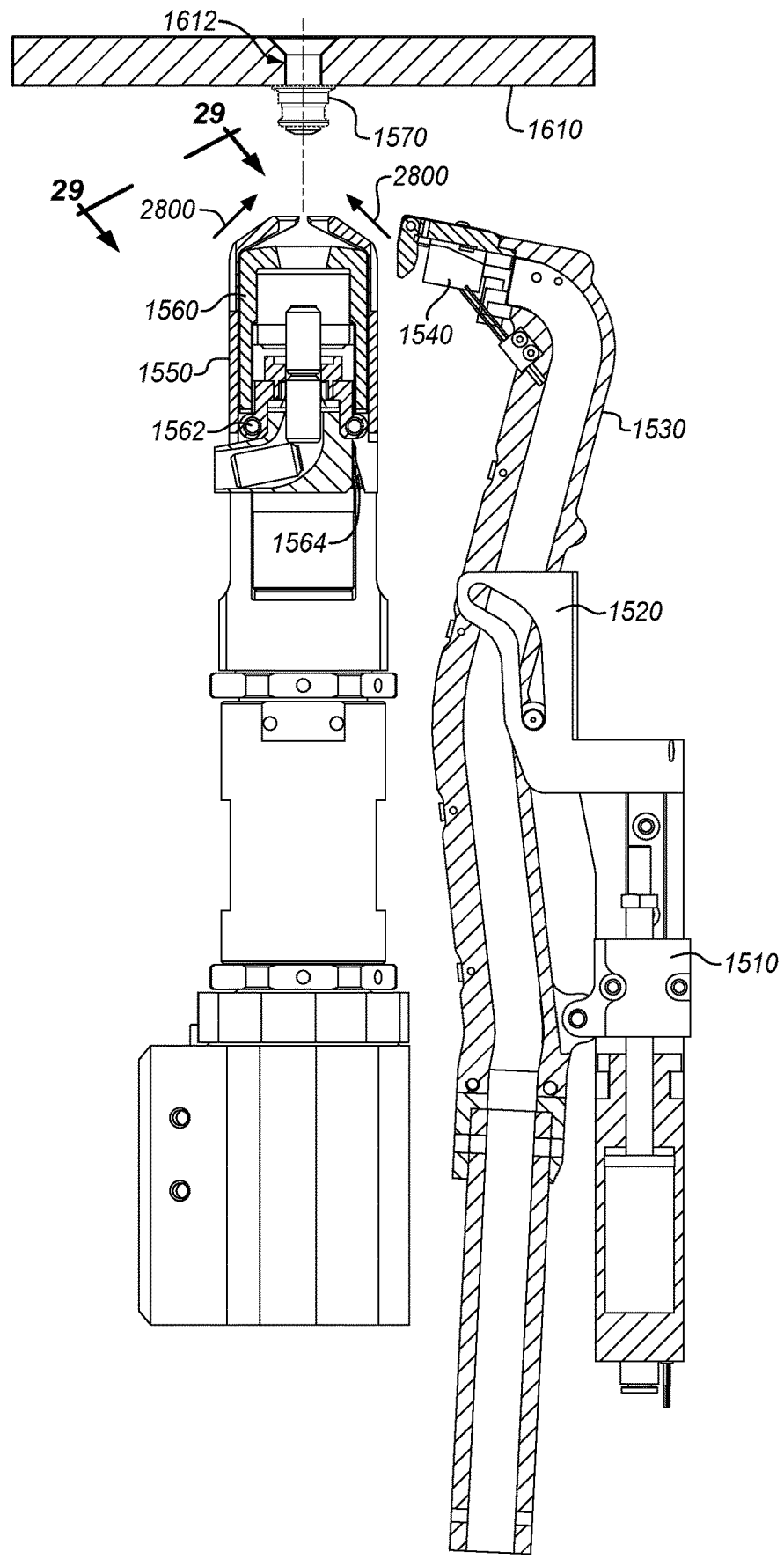
FIG. 21 is a cut-through diagram depicting fingers returning to original positions in accordance with an illustrative embodiment.

In FIG. 20, swaging is completed, resulting in the installation of a fastener through hole 1612. Swage nose 1550 therefore retracts in direction 2700. This causes fingers 1560 to return to their original positions along direction 2800 as shown in FIG. 21, wherein biasing devices 1564 hold fingers 1560 poised above swage nose 1550.

Figure 22:
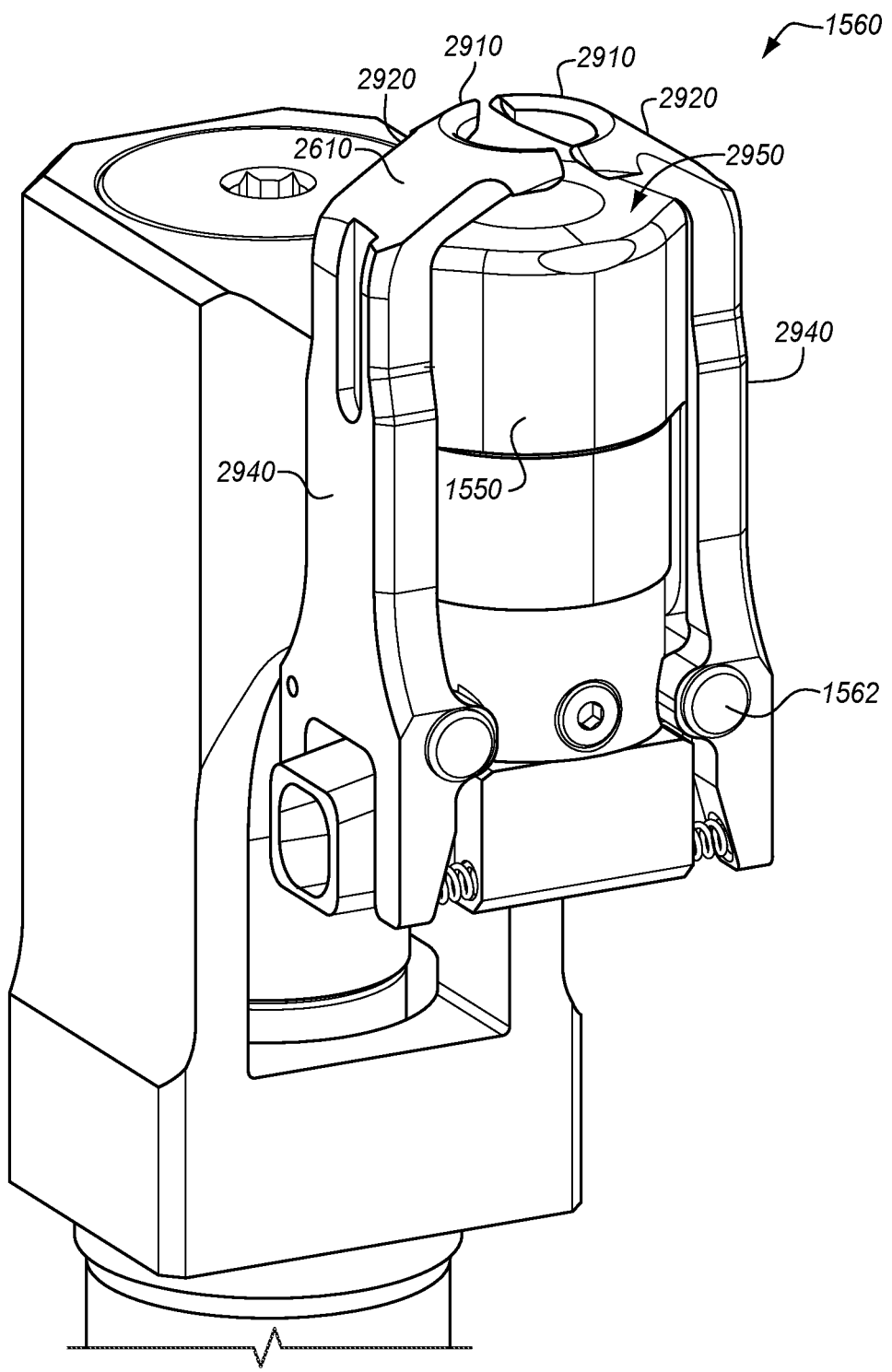
FIG. 22 is a zoomed in view of fingers at a swage nose in accordance with an illustrative embodiment.

FIG. 22 is a zoomed in view of fingers 1560 at a swage nose 1550 in an illustrative embodiment. FIG. 22 illustrates that each of fingers 1560 includes a vertical portion 2940 that follows the swage nose 1550 and that pivots about a hinge 1562 at the swage nose. Inclined ramps 2610 are integral with the vertical portion 2940, and extend beyond a swaging surface 2950 of the swage nose 1550. Thus, force applied to the inclined ramp 2610 by the swage nose as the swage nose 1550 extends swings the vertical portion 2940 about the hinge 1562 and away from the swage nose 1550. This means that the fingers 1560 are moved out of engagement with the collar when no longer needed to hold the collar (e.g., because a lockbolt is now in the process of being swaged to the collar). Each finger 1560 also includes an arcuate cut-out 2910 disposed at a distal portion 2920 of the inclined ramp 2610. The arcuate cut-out 2910 has a circumference corresponding with a circumference of a lockbolt collar. Thus, a diameter of the arcuate cut-out is sized to mate with the non-flange portion of a collar.

Figure 23:
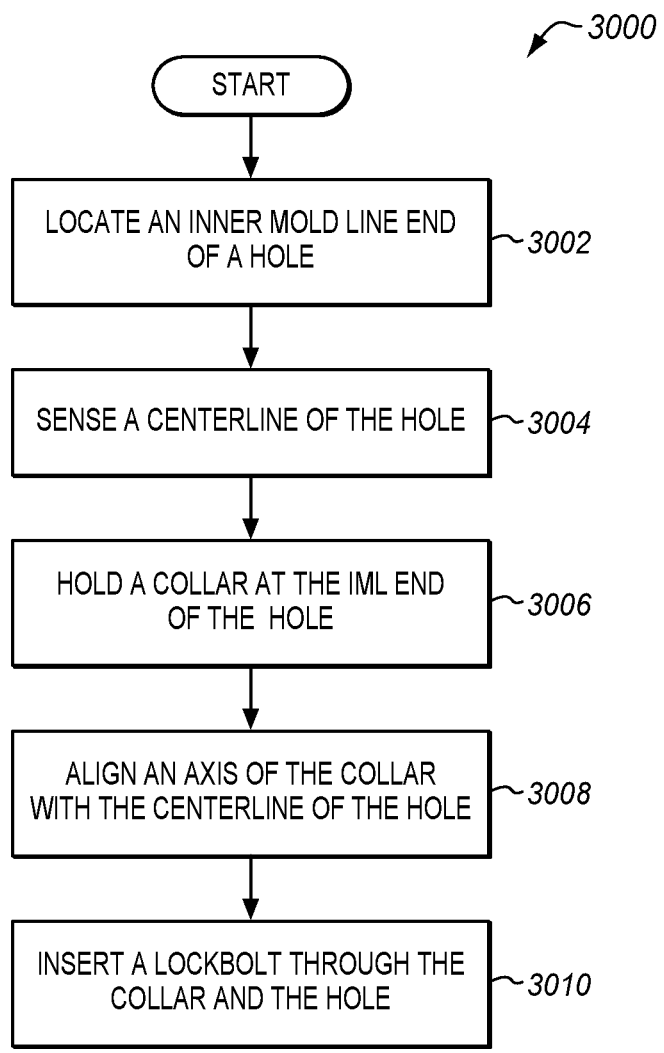
FIG. 23 is a flowchart illustrating a further method for supplying a collar to a swage tool in accordance with an illustrative embodiment.

FIG. 23 is a flowchart illustrating a further method for supplying a collar to a swage tool in accordance with an illustrative embodiment. According to FIG. 30, method 3000 includes locating an Inner Mold Line (IML) end (e.g., first end 1616) of a hole 1612 (step 3002), sensing a centerline 1614 of the hole 1612 (step 3004) (e.g., via any of the sensing devices discussed above) and holding a collar 1570 at the IML, end (e.g., first end 1616) of the hole (step 3006). Method 3000 also includes aligning an axis 2010 (aka, a centerline) of the collar with the centerline 1614 of the hole 1612 (step 3008), and inserting a lockbolt 2510 through the collar 1570 and the hole 1612 (step 3010). Insertion of the lockbolt 2510 through the hole 1612 and the collar 1570 may be performed in a single action, but in further embodiments it is possible that the lockbolt 2510 may be placed into the OML side of the hole 1612 with the pintail not exiting the IML, end of the hole 1612 and then be driven into the hole 1612 and through the collar 1570 in one action. This results in the head of the lockbolt 2510 being seated on the OML in either a countersink or against the flat OML. Swaging may then be performed.

Figure 24:
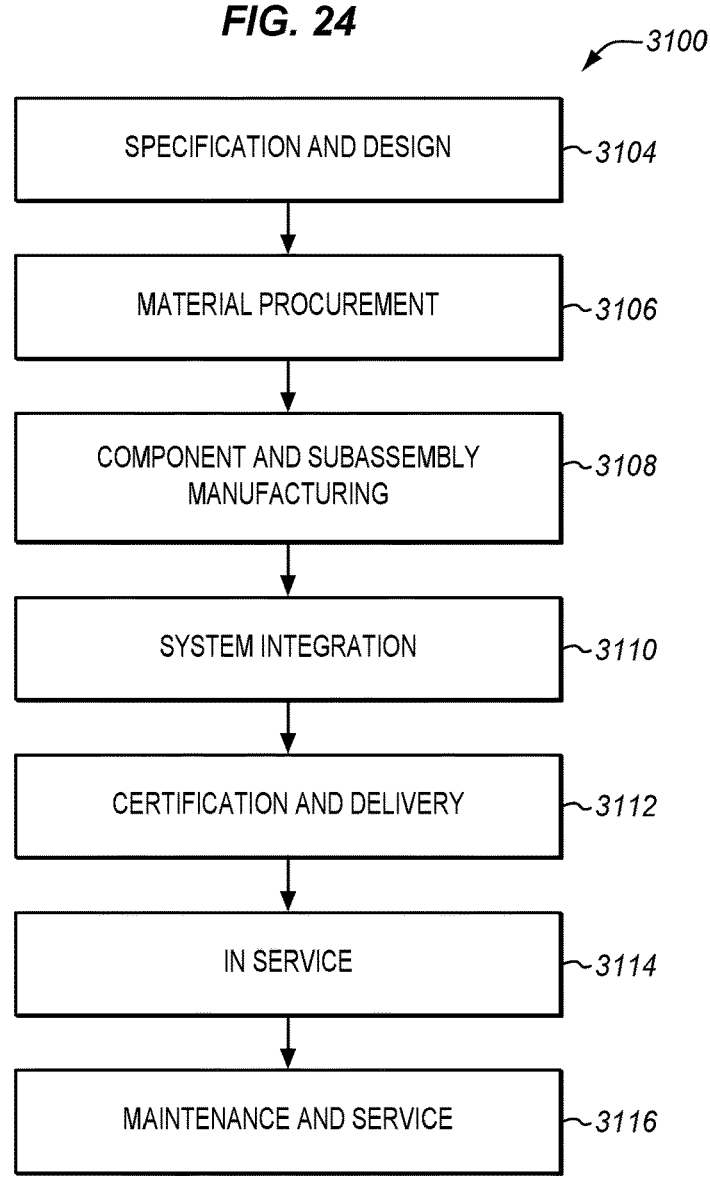
FIG. 24 is a flow diagram of aircraft production and service methodology in accordance with an illustrative embodiment.
Figure 25:
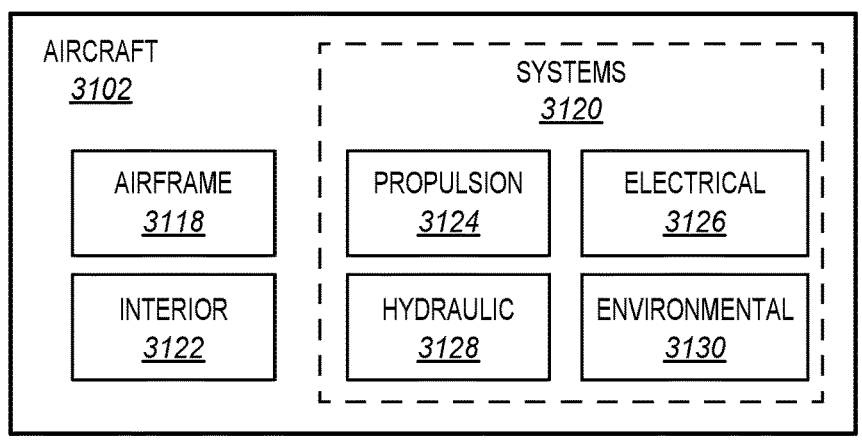
FIG. 25 is a block diagram of an aircraft in accordance with an illustrative embodiment.

Referring more particularly to the drawings, embodiments of the disclosure may be described in the context of aircraft manufacturing and service in method 3100 as shown in FIG. 24 and an aircraft 3102 as shown in FIG. 25. During pre-production, method 3100 may include specification and design 3104 of the aircraft 3102 and material procurement 3106. During production, component and subassembly manufacturing 3108 and system integration 3110 of the aircraft 3102 takes place. Thereafter, the aircraft 3102 may go through certification and delivery 3112 in order to be placed in service 3114. While in service by a customer, the aircraft 3102 is scheduled for routine work in maintenance and service 3116 (which may also include modification, reconfiguration, refurbishment, and so on). Apparatus and methods embodied herein may be employed during any one or more suitable stages of the production and service described in method 3100 (e.g., specification and design 3104, material procurement 3106, component and subassembly manufacturing 3108, system integration 3110, certification and delivery 3112, service 3114, maintenance and service 3116) and/or any suitable component of aircraft 3102 (e.g., airframe 3118, systems 3120, interior 3122, propulsion system 3124, electrical system 3126, hydraulic system 3128, environmental 3130).

Each of the processes of method 3100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 3102 produced by method 3100 may include an airframe 3118 with a plurality of systems 3120 and an interior 3122. Examples of systems 3120 include one or more of a propulsion system 3124, an electrical system 3126, a hydraulic system 3128, and an environmental system 3130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 3100. For example, components or subassemblies corresponding to component and subassembly manufacturing 3108 may be fabricated or manufactured in a manner similar to components or subassemblies produced while the aircraft 3102 is in service. Also, one or more apparatus embodiments, method embodiments, or a combination thereof may be utilized during the subassembly manufacturing 3108 and system integration 3110, for example, by substantially expediting assembly of or reducing the cost of an aircraft 3102. Similarly, one or more of apparatus embodiments, method embodiments, or a combination thereof may be utilized while the aircraft 3102 is in service, for example and without limitation during the maintenance and service 3116. For example, the techniques and systems described herein may be used for material procurement 3106, component and subassembly manufacturing 3108, system integration 3110, service 3114, and/or maintenance and service 3116, and/or may be used for airframe 3118 and/or interior 3122. These techniques and systems may even be utilized for systems 3120, including, for example, propulsion system 3124, electrical system 3126, hydraulic 3128, and/or environmental system 3130.

In one embodiment, a part comprises a portion of airframe 3118, and is manufactured during component and subassembly manufacturing 3108. The part may then be assembled into an aircraft in system integration 3110, and then be utilized in service 3114 until wear renders the part unusable. Then, in maintenance and service 3116, the part may be discarded and replaced with a newly manufactured part. Inventive components and methods may be utilized throughout component and subassembly manufacturing 3108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus for delivering lockbolt collars at a swage tool, the apparatus comprising:
a pair of fingers disposed at a swage nose, each of the fingers comprising:
a vertical portion that follows the swage nose;
an inclined ramp, that is integral with the vertical portion, and that extends from the vertical portion in a direction of travel of the swage nose beyond a swaging surface of the swage nose; and
an arcuate cut-out disposed at a distal portion of the inclined ramp, the arcuate cut-out having a circumference corresponding with a circumference of a lockbolt collar,
wherein the vertical portions of the pair of fingers are separated from each other by the swage nose.

2. The apparatus of claim 1 wherein:
the vertical portion of each of the fingers pivots about a corresponding hinge at the swage nose.

3. The apparatus of claim 1 wherein:
the inclined ramp of each of the fingers is configured to receive force from the swage nose that swings the vertical portion of each of the fingers about a corresponding hinge and away from the swage nose.

4. The apparatus of claim 1 wherein:
the arcuate cut-out of each of the fingers is sized to mate with a non-flange portion of the lockbolt collar.

5. The apparatus of claim 1 wherein:
the arcuate cut-out of each of the fingers has a circumference dimensioned for seating a flange of the lockbolt collar.

6. The apparatus of claim 1 further comprising:
a collar delivery system that places the lockbolt collar between the fingers.

7. The apparatus of claim 1 further comprising:
hinges, at each of the fingers, that are biased to draw the arcuate cut-outs of each of the fingers towards each other, in order to clamp the lockbolt collar below a flange of the lockbolt collar.

8. The apparatus of claim 1 wherein:
the vertical portion of each of the fingers is flush with the swage nose.

9. The apparatus of claim 1 further comprising:
hinges at each of the fingers that apply force which holds the lockbolt collar between the fingers while the swage nose is retracted.

10. The apparatus of claim 1 further comprising:
a collar feed arm that transports lockbolt collars to the fingers;
a guide that controls motion of the collar feed arm as the collar feed arm extends towards the fingers and retracts away from the fingers; and
an actuator that drives the collar feed arm.

11. The apparatus of claim 1 wherein:
the fingers point upward, and receive the lockbolt collar having a flange disposed at an upward portion.

12. The apparatus of claim 1 further comprising:
springs that are configured to return the fingers to original positions after the fingers have been rotated.

13. The apparatus of claim 1 further comprising:
a movement system configured to move the apparatus around a rotation axis.

14. The apparatus of claim 13 wherein:
the movement system is further configured for placement onto a track system.

15. The apparatus of claim 1 further comprising:
biasing devices that are configured to cause the fingers to apply gripping force.

16. The apparatus of claim 1 wherein:
the swage nose is configured for placement at an Inner Mold Line (IML) surface.

17. The apparatus of claim 1 further comprising:
a vacuum system configured to remove debris.

18. The apparatus of claim 1 further comprising:
a sensor system configured to generate sensor data for a position of the apparatus.

19. The apparatus of claim 1 further comprising:
a sensor system configured to generate sensor data for controlling operation of the apparatus.

20. The apparatus of claim 1 further comprising:
a sensor system comprising at least one of a camera system, a laser sensor, an ultrasonic sensor, or a light detection and ranging scanner.

21. A method for placing a collar on a lockbolt, the method comprising:
locating an Inner Mold Line (IML) end of a hole;
sensing a centerline of the hole;
holding a lockbolt collar against the IML end of the hole via a pair of fingers disposed at a swage nose, wherein each finger includes a vertical portion that follows the swage nose, an inclined ramp, that is integral with the vertical portion, and that extends from the vertical portion in a direction of travel of the swage nose beyond a swaging surface of the swage nose, and an arcuate cut-out disposed at a distal portion of the inclined ramp, the arcuate cut-out having a circumference corresponding with a circumference of the lockbolt collar, wherein the vertical portions of the pair of fingers are separated from each other by the swage nose;

aligning an axis of the lockbolt collar with the centerline of the hole; and inserting a lockbolt through the lockbolt collar and the hole.

22. The method of claim 21 further comprising:

pivoting the vertical portion of each of the fingers about a corresponding hinge at the swage nose.

23. The method of claim 21 further comprising:

applying force to the inclined ramp of each of the fingers via the swage nose as the swage nose swings the vertical portion of each of the fingers about a corresponding hinge and away from the swage nose.

24. The method of claim 21 further comprising:

disposing a circumference of the lockbolt collar within a circumference of the arcuate cut-out.

25. The method of claim 21 further comprising:

seating a flange of the lockbolt collar at the arcuate cut-out.

26. The method of claim 21 further comprising:

placing the lockbolt collar between the fingers via a collar delivery system.

27. The method of claim 21 further comprising:

holding the vertical portion of each of the fingers flush with the swage nose.

28. The method of claim 21 further comprising:

applying force via hinges that holds the lockbolt collar between the fingers while the swage nose is retracted.

* * * * *